(12) United States Patent
Meinherz et al.

(10) Patent No.: US 9,798,040 B2
(45) Date of Patent: Oct. 24, 2017

(54) METHOD FOR SYNCHRONIZING OPTICAL UNITS OF A PHOTOELECTRIC BARRIER AND LIGHT CURTAIN

(71) Applicant: CEDES SAFETY & AUTOMATION AG, Landquart (CH)

(72) Inventors: Carl Meinherz, Malans (CH); Martin Hardegger, Sargans (CH); Christopher Walther, Wolfhalden (CH); Danilo Dorizzi, Klosters (CH)

(73) Assignee: Rockwell Automation Safety AG (CH)

( * ) Notice: Subject to any disclaimer, the term of this patent is extended or adjusted under 35 U.S.C. 154(b) by 540 days.

(21) Appl. No.: 14/301,436

(22) Filed: Jun. 11, 2014

(65) Prior Publication Data

US 2014/0361149 A1 Dec. 11, 2014

(30) Foreign Application Priority Data

Jun. 11, 2013 (EP) .................... 13171484

(51) Int. Cl.
*G01V 8/20* (2006.01)
*G01V 8/10* (2006.01)
*G06F 3/042* (2006.01)

(52) U.S. Cl.
CPC ............... *G01V 8/20* (2013.01); *G01V 8/10* (2013.01); *G06F 3/0421* (2013.01)

(58) Field of Classification Search
CPC .... F16P 3/144; G06F 3/0421; F16D 2500/51; F16D 2500/5114
USPC ... 250/221, 208.4, 222.1, 214 R, 214.1, 206; 361/186, 170, 173–177; 72/8.1, 14.1, 72/14.3, 21.1, 21.3; 100/342, 348; 340/508, 506, 507, 540, 541, 545.3, 552,
(Continued)

(56) References Cited

U.S. PATENT DOCUMENTS

| | | | |
|---|---|---|---|
| 4,650,990 A | 3/1987 | Jonsson | |
| 4,734,575 A * | 3/1988 | Wagli | G08B 13/183 250/221 |

(Continued)

FOREIGN PATENT DOCUMENTS

| | | |
|---|---|---|
| CN | 201801283 U | 4/2011 |
| DE | 19510304 C1 | 2/1996 |

(Continued)

OTHER PUBLICATIONS

Upender et al., Communication Protocols for Embedded Systems, Embedded Systems Programming, 7(11), pp. 46-58 (1994).*

(Continued)

*Primary Examiner* — Francis M Legasse, Jr.
(74) *Attorney, Agent, or Firm* — Boyle Fredrickson, SC

(57) ABSTRACT

The present invention relates to a method for synchronizing the optical units of a photoelectric barrier and to such a photoelectric barrier. The synchronization method comprises the steps of transmitting radiation forming a synchronization signal from a first optical sender of the first optical unit; controlling a plurality of the optical receivers of the at least one second optical unit to monitor whether the synchronization signal has been received and performing a synchronization step if the synchronization signal has been received. The method further performs the step of defining at least one of said plurality of optoelectronic components to be used for the synchronization step.

18 Claims, 29 Drawing Sheets

(58) Field of Classification Search
USPC ............ 340/555–557, 573.1, 599, 600; 209/576–586; 192/116.5, 129 R, 130, 192/131 R, 131 H
See application file for complete search history.

(56) References Cited

U.S. PATENT DOCUMENTS

| | | | |
|---|---|---|---|
| 8,058,605 B2 | 11/2011 | Scheiber | |
| 2007/0215806 A1 | 9/2007 | Bomparet | |
| 2010/0127158 A1* | 5/2010 | Scheiber | F16P 3/14 250/208.1 |
| 2011/0226938 A1* | 9/2011 | Tagashira | G01V 8/20 250/222.1 |
| 2012/0068055 A1* | 3/2012 | Burger | G01V 8/20 250/221 |
| 2014/0091898 A1* | 4/2014 | Burger | G05B 9/02 340/3.1 |

FOREIGN PATENT DOCUMENTS

| | | | | |
|---|---|---|---|---|
| DE | EP 2713187 A1 * | 4/2014 | ............ | G01V 8/20 |
| EP | 1835311 A1 | 9/2007 | | |
| EP | 1870734 B1 | 1/2009 | | |
| EP | 2071363 A2 | 8/2009 | | |
| EP | 2511737 A1 | 10/2012 | | |

OTHER PUBLICATIONS

Chinese Patent Office Actlon dated May 4, 2016 with English translation; Chinese Patent Application No. 201410222318.4—(17) pages.
Extended European search report dated Dec. 20, 2013; Application No. 13171484.2—(6) Pages.

* cited by examiner

METHOD FOR SYNCHRONIZING OPTICAL UNITS OF A PHOTOELECTRIC BARRIER AND LIGHT CURTAIN

CROSS-REFERENCE TO RELATED APPLICATIONS

This application claims priority to European Patent Application No. 13 171 484.2, filed Jun. 11, 2013, the entire contents of which is incorporated herein by reference.

BACKGROUND OF THE INVENTION

The subject matter disclosed herein relates generally to light curtains and photoelectric barriers and, more specifically, to safety light curtains for monitoring a protective field and, in particular, to such light curtains which comprise a plurality of optoelectronic components interconnected by a communication bus. In particular, the present invention relates to a method for synchronizing the optical units of a photoelectric barrier and to such a photoelectric barrier.

Generally, photoelectric barriers, also referred to as light curtains or light grids, detect the movement or intrusion of objects into guarded zones, and more particularly, provide protection for human operators who are working with machines or other industrial equipment.

Light curtains employing infrared or visible light beams are used to provide operator safety in a variety of industrial applications. Light curtains typically are employed for operator protection around machinery, such as punch presses, brakes, molding machines, automatic assembly equipment, coil winding machinery, robot operation, casting operations and the like. Conventional light curtains typically employ light emitting diodes (LED) mounted at spaced positions along a transmitter bar at one side of the guard zone and phototransistors (PT), photodiodes or photoreceivers mounted along a receiver bar at the opposite side of the zone. The LEDs transmit modulated infrared light beams along separate parallel channels to the PTs at the receiver bar. If one or more beams are blocked by an opaque object, such as the operator's arm, a control circuit shuts the machine down, prevents the machine from cycling, or otherwise safeguards the area.

Usually, safety light curtains comprise two optical units (also called bars, sticks, edges or strips), which are formed as two different constructional units, one of the optical units having the functionality of an emitter and one of a receiver. This dedicated architecture of an emitter and receiver, however, has several drawbacks.

Firstly, the fabrication costs are high, because each type of optical unit has to be fabricated differently. Further, due to the fact that the optical communication is only unidirectional, i.e. from the sender to the receiver, the optical synchronization may be difficult and a transmission of communication information is possible only in one direction.

it has already been proposed to locate receivers and transmitters on each of the first and second optical units, as this is described in the European patent EP 1 870734 B1. Here, the light curtain has two identical transmitting/receiving strips, to which transmitting and receiving units are fixed. The transmitting/receiving strips are placed opposite to each other with a protective field being formed between the strips. The transmitting/receiving strips are identically formed in control and evaluation units. The control and evaluation units have safety outputs, which are formed together as a switching channel. An identical power supply is provided for all the strips.

Furthermore, it is known from EP 2511737 A1 to provide a modular light curtain and optical unit for such a light curtain.

When operating a photoelectric barrier, there is always the need of a tight synchronization of the optical units forming the light curtain in respect to each other. For establishing a synchronized operation two different cases have to be distinguished. Firstly, after the initial startup or after a complete interruption of the communication between the two parts of the light curtain, the system is completely out of synchronization and the two optical units have to find each other, and if the emitter on one of the units sends a synchronization signal, the receiver on the other optical unit does not necessarily have to be prepared to receive a signal from the opposing emitter.

On the other hand, also during normal operation when the system is synchronized by and large, this synchronization gets lost in time due to slightly different clock frequencies and propagation times within the optical units. Therefore, the two optical units also have to be resynchronized by some few microseconds during normal operation.

Furthermore, photoelectric barriers often have the function of a so-called blanking, meaning that one or two radiation beams can be disabled in order to allow larger objects to pass through the sensing field without causing an alarm signal. Effectively, this blanking changes intermediately the minimum object resolution of the light curtain in order to for instance allow for supply material to enter the protected area. Apart from the so-called fixed channel blanking, where only pre-defined fixed beams can be switched off, the so-called floating blanking allows the disabling of up to two light curtain beams at any location within the sensing field.

In known systems, a drawback can be seen in the fact that only those regions are accessible for a floating blanking which are not needed for the synchronization.

From U.S. Pat. No. 8,058,605 B2 an optoelectronic sensor is known that comprises a first and a second sensor part each being composed of a plurality of transceiving modules which exchange modulated beams for reducing the effects of optical disturbances for instance due to light reflection or incident sunlight. The optical communication protocol between the two sensor parts can be used for synchronizing the sensor parts to each other. However, according to this document only the transmitting and receiving modules of the sensor parts situated directly opposite one another can communicate optically with one another by means of transmitted beams.

Thus, it would be desirable to provide a light curtain and a method for synchronizing at least two optical modules with each other, which reduces the expenditure during assembly and also complies with the requirements for a design for testability and maintenance.

BRIEF DESCRIPTION OF THE INVENTION

The subject matter disclosed herein describes a method for synchronizing at least two optical modules in a light curtain with each other. When synchronizing the two optical units of a photoelectric barrier, more than one of the optical receivers of an opposing optical unit are expecting a synchronization signal emitted by one or more emitters located at the first optical unit. The synchronization method comprises the steps of transmitting radiation forming a synchronization signal from a first optical sender of the first optical unit, controlling a plurality of optical receivers of at least one second optical unit to monitor whether the synchronization signal has been received, and to store a timing information on when the synchronization signal has been detected, if the synchronization signal is detected. Further, the optical senders of the plurality of the second optical units are controlled to emit radiation forming an acknowledge signal, if the synchronization signal is detected. Upon receipt of the acknowledge signal a start signal is sent back from the first optical sender and starts the monitoring operation of the normal scan procedure.

According to one embodiment of the present invention the paired light emitting element and responding light receiving element that constitute a synchronization beam are not predetermined but are defined during the synchronization procedure. Any pair of light emitting element and responding light receiving element can be used for synchronization. In particular, at least one light emitting element is instructed to emit radiation and if it turns out to be in a position where an unobstructed radiation beam can be formed, the at least one belonging counterpart is defined as the receiving element for performing the synchronization step.

The advantage of this method of synchronizing two optical units firstly lies in the fact that it still functions even for the case that comparatively large objects interrupt the light curtain in a blanking mode. Furthermore, the complexity of the optical unit is low, because no additional synchronizing senders and receivers have to be provided. In particular for blanking options, this method of synchronization is advantageous, because the probability that at least one of the active receivers recognizes the sync signal is very high. Furthermore, also a muting can be established easily without losing the synchronization. Also, the robustness against other light curtain systems, ambient light, EMC or other disturbances is high, because in case that the synchronization is lost, a resynchronization can be achieved within short time. Due to the fact that the emitted radiation may also be sent in pulse patterns, thus forming encoded radiation beams, the system can securely distinguish between those signals which are to be decoded, and disturbing signals which are to be disregarded.

According to an advantageous embodiment, for the case that the transmitting optical unit does not detect an acknowledge signal, the transmission of the synchronization signal is repeated from a second optical sender of the first optical unit. This can be repeated along the optical unit until a free zone for performing the synchronization is found. Hence, a high flexibility regarding blanking or muting functions is achieved. Furthermore, in order to comply with safety requirements, a particular timeout can be defined, and after this timeout has been reached, a warning signal can be transmitted which indicates that the synchronization has not been successfully performed.

It has to be noted that when the synchronization signal is transmitted sequentially by each of the plurality of the optoelectronic components until an acknowledge signal is detected or a predefined timeout is reached, this does not necessarily mean that the optoelectronic components are activated sequentially in a geometric sense, but only in a chronological sense.

In order to provide the necessary timing information for performing a synchronization, a time window is defined within which the synchronization signal is expected at the second optical unit. The position of the detected signal is stored as a time stamp. This allows a very efficient and simple way of marking the respective time frames.

According to a further advantageous embodiment, a plurality of the optoelectronic components of one optical unit simultaneously monitors whether the synchronization signal is received. For instance, the optoelectronic components of each optical unit may he grouped together in the form of modules, wherein each of the optoelectronic components of one module simultaneously monitors whether the synchronization signal is received.

In order to enhance the flexibility of the communication protocol and furthermore, be able to discern more easily between disturbances and the signals that have to be detected, one or more of the synchronization signal, the acknowledge signal and the start signal is formed by a pulsed signal having a specific pulse pattern. In particular in application environments, where different light curtains are operating in close vicinity, this use of a coded pulse signal reduces the probability of errors.

Advantageously, also more than two optical units can be synchronized with each other.

For a flexible architecture, which can be based on absolutely identical optical units, control elements of the plurality of optoelectronic components are connected to each other and to a controller module located in each optical unit via a communication bus and the synchronization procedure is initiated by a synchronization command transmitted from the controller module. This controller module represents the bus master for the respective optical unit. In addition to that, one of the optical units can be defined as a principle optical unit, whereas the second optical unit can be defined as a companion or slave optical unit.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
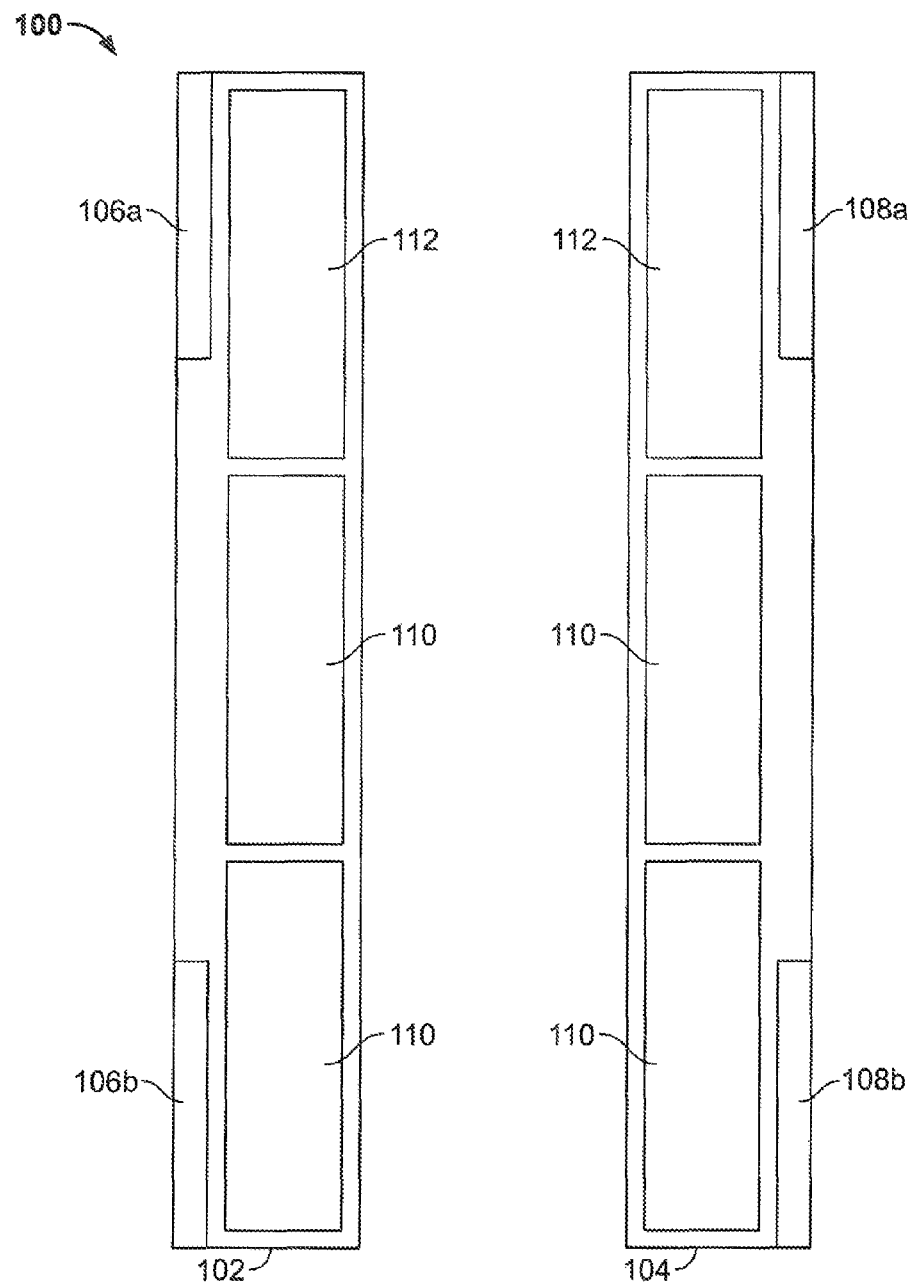
FIG. 1 shows a schematic representation of a light curtain having two optical units.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled m the art.

DETAILED DESCRIPTION OF THE PREFERRED EMBODIMENTS

Turning initially to FIG. 1, a schematic representation of a light curtain comprising two optical units is shown.

The light curtain 100 in this embodiment consists of two identical first and second optical units 102, 104, which form between each other a plurality of light barriers for monitoring a protective field. However, the ideas of the present invention are also applicable in systems which comprise more than two optical units. The optical units 102, 104 may for instance be formed according to the principles of the European patent application EP 2511737 A1, and may m particular use plug-in modules 106, 108 for defining their respective functionality.

According to the embodiment shown in FIG. 1, each optical unit 102, 104 comprises two identical modules 110 each having light emitting and light receiving elements. These optical modules 110 are identically built for both optical units 102, 104. Each of the optical units 102, 104 further comprises at least one second optical module 112 that also comprises a microcontroller providing the necessary intelligence to the optical unit 102, 104. Each of the modules 110, 112 may for instance have a height of about 150 mm. However, any other size or number of modules within each optical unit 102, 104 can also be used together with the present invention. Essentially, the first and second optical unit 102, 104 are identically built except for the plug-in modules 106a, 106b and 108a, 108b which are defining the particular functionality of each of the optical units.

Each of the optical modules 110 comprises a plurality of optoelectronic components with their associated circuitry for emitting and sensing the radiation beams. The second optical module 112 contains the same optical functions and additionally, at least one microcontroller and optionally electronic circuitry, such as an interface with an external connector. However, for using a synchronization method according to the present invention, the optoelectronic components do not necessarily have to be grouped in optical modules 110, 112.

Figure 2:
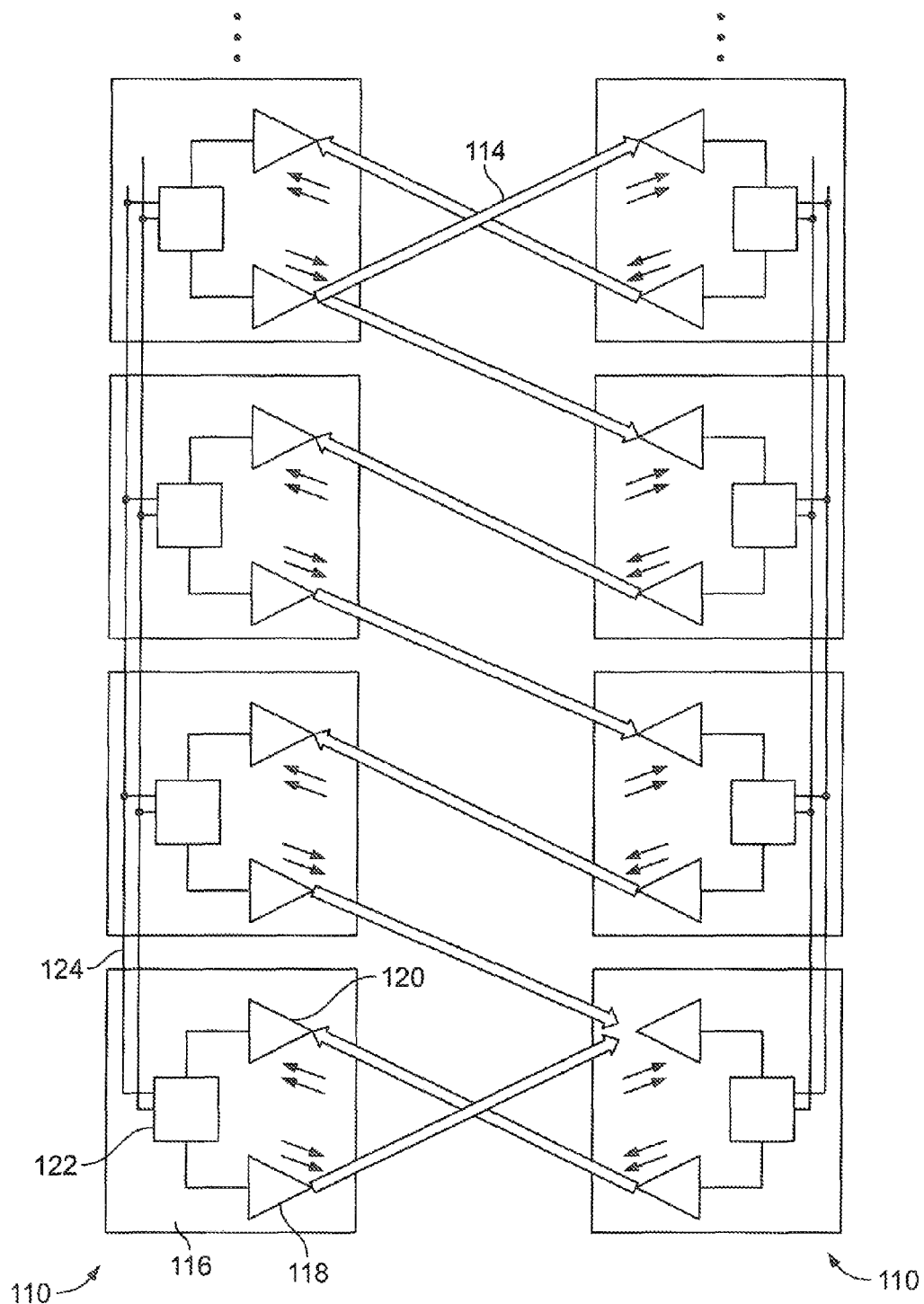
FIG. 2 shows a schematic representation of a light curtain comprising two optical units.

A more detailed view of a part of two opposing optical modules 110 is given with reference to FIG. 2. The light curtain may be firmed by a linear array of radiation beams 114 which can either be infrared radiation with a wavelength between about 750 nm and 1000 nm, or visible light having a wavelength between about 620 nm and 800 nm.

The radiation beams 114 may for instance be activated sequentially, one beam at a time, from one peripheral end to the other peripheral, end of each stick. Because each optical unit 102, 104 has transmitting and sensing photo elements, the scan through the light curtain activates every element sequentially and with an alternating direction, the beam being sent from the second optical unit 104 to the first optical unit 102 and back again. During such a scan sequence, the respective receiving stick always only sequentially detects the light from the pre-determined emitting element to the corresponding receiving element. In order to allow for such a complex scan procedure, each optical unit 102, 104 is formed by a plurality of optoelectronic components 116 each comprising at least one light-emitting element 118 and at least one light-receiving element 120.

Each of the optoelectronic components 116 has a rather high degree of integrated intelligence in the form of a separate control element 122 which may for instance be formed as an integrated circuit, such as an application specific integrated circuit (ASIC). Each of the optoelectronic components 116 provides electronic circuitry for driving the at least one light-emitting element 118 and for processing signals generated by the at least one light-receiving element 120. In order to communicate with the higher level controller, each of the optoelectronic components 116 is connected to a communication bus 124.

According to the present invention, a synchronization scheme is provided which is needed for accurately performing the complex emitting and detecting sequences performed by the light curtain of FIGS. 1 and 2.

Figure 3:
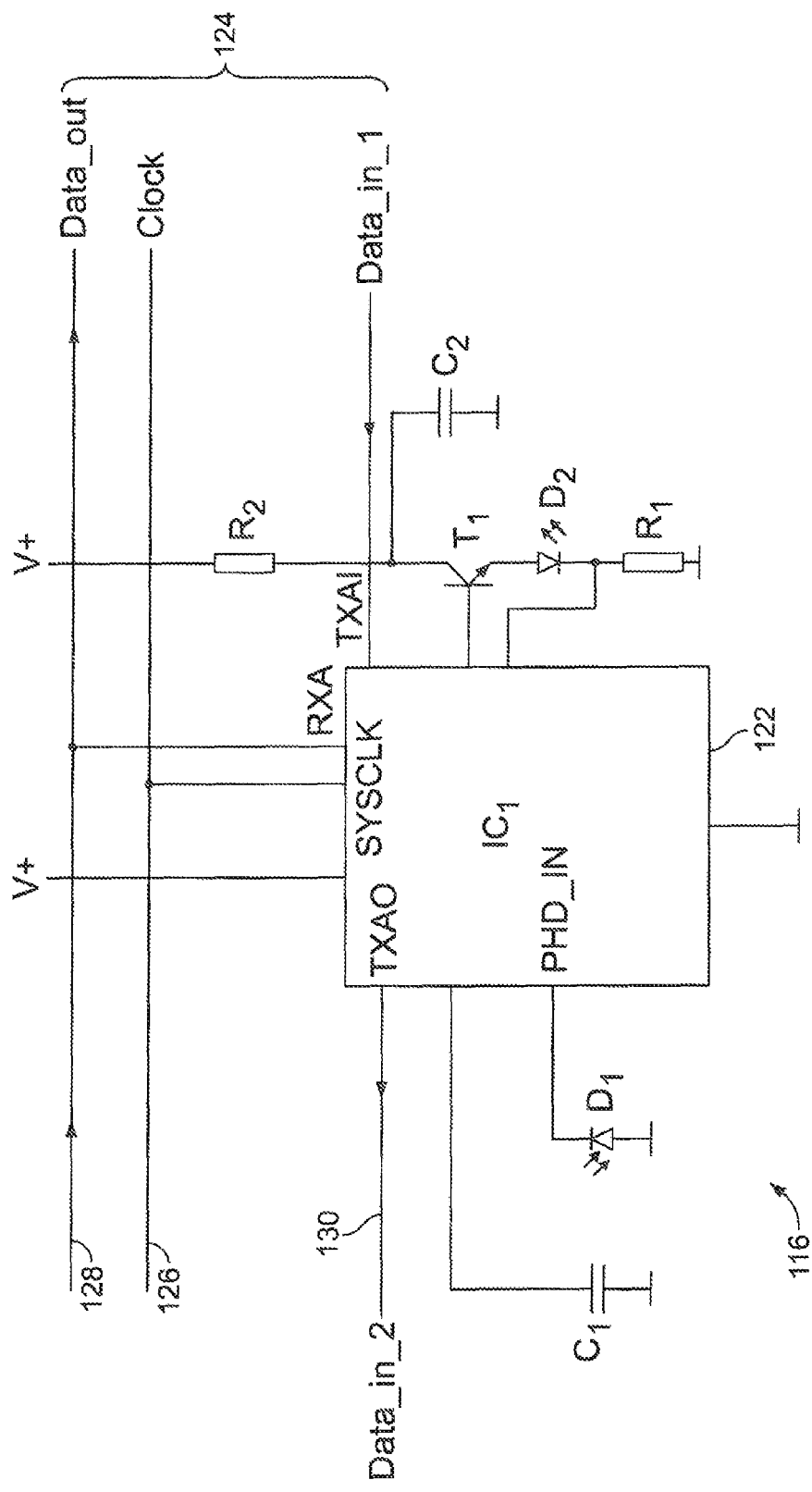
FIG. 3 shows circuit diagram of an optoelectronic component according to the present invention.

FIG. 3 shows in a schematic representation one optoelectronic component 116 with its interconnection terminals and the control element 122. According to the illustrated embodiment, the optoelectronic component 116 comprises a light emitting element, such as a light emitting diode, LED, D2, and a light receiving element, such as photo diode D1. According to the illustrated embodiment of the present invention, the control element 122 is connected via a communication bus 124 to the next following optoelectronic component or, in case that it is the one next to the controller of the optical unit, to the controller. The bus comprises a data-out line which transports signals from the microcontroller (the master of the system) to the control element 122. According to the embodiment shown in FIG. 3, the communication bus 124 between the microcontroller functioning as the master and the plurality of control elements 122 is a serial/parallel bus based on three communication lines: a clock, a data-in line and a data-out line. The global system clock 126 is controlled by the master. This clock is recovered on each control element 122 and provides the main clock for the functioning of the control element 122.

The data transmission line (data-out) is configured as a single bit unidirectional connection from the master to the control elements 122. In particular, the data-out line is a shared communication line out of the microcontroller to all of the control elements 122. In other words, all control elements 122 are connected in parallel and the transmission line is buffered on each module if the plurality of optoelectronic components is grouped together in optical modules 110.

The data-in line 130 is another single bit unidirectional line for receiving data which is sent from the control elements 122 to the master. According to the embodiment shown in FIG. 3, the data-in line 130 is a daisy chain line which is passed on from one control element 122 to the next. During normal operation, the control element receives data from the neighboring control element. An arrow gives the signal flow for this operation. On the following clock cycle the data are propagated to the next control element 122.

In the shown embodiments, every communication is initiated by the master. However, for the idea according to the present invention this does not necessarily have to be the case. A particular control element 122 may only transmit information onto the data-in line 130 after a request originated by the master has been recognized and validated. The response onto the data-in line 130 must then follow the particular bus protocol. Moreover, the communication line from the control elements 122 to the microcontroller is a point-to-point communication bus which is synchronous to the single global system clock. That means that each control element 122 takes information from the previous control element and forwards the merged results of that data and its internal data to the next control element, with a configurable option to register the data in a flip flop and send it on the following clock.

Each control element 122 is connected to a single power line (V+) which may for instance be a 12 V to 15 V power line. The control element 122 may also comprise internal power management blocks for regulating its own power supply.

The main functions of the optoelectronic component 116 lie in sensing and emitting pulsed radiation in a controlled manner under the supervision of a microcontroller.

The photodiode D1 senses radiation, and in particular light, coming from the opposing optical unit and generates an analog input signal which is connected to a receiving amplifier integrated into the control element 122. It is also contemplated that more than one photodiode can be provided.

Furthermore, the control element 122 controls an LED drive circuit so that the LED, D2, emits a radiation beam to the opposing optical unit. The drive circuit is controlled by the control element 122 in a way that the emitted light intensity has a specified level. It is contemplated that more than one light-emitting diode D2 may be provided in the circuit according to FIG. 3. As already set forth above, the control element 122 is operable to communicate with the microcontroller over two communication lines. The communication line from the microcontroller to the control element 122 is a shared communication. All control elements in one module are connected in parallel with a digital buffer isolating each of the modules from the next one.

For instance, according to a typical implementation, an optical module 110 has eight optoelectronic components 116, forming a total of 16 beams, eight in each direction.

For regulating the driver transistor T1 of the diode D2 a sensing input is provided for sensing the emitted current of the light emitting diode D2.

Figure 4:
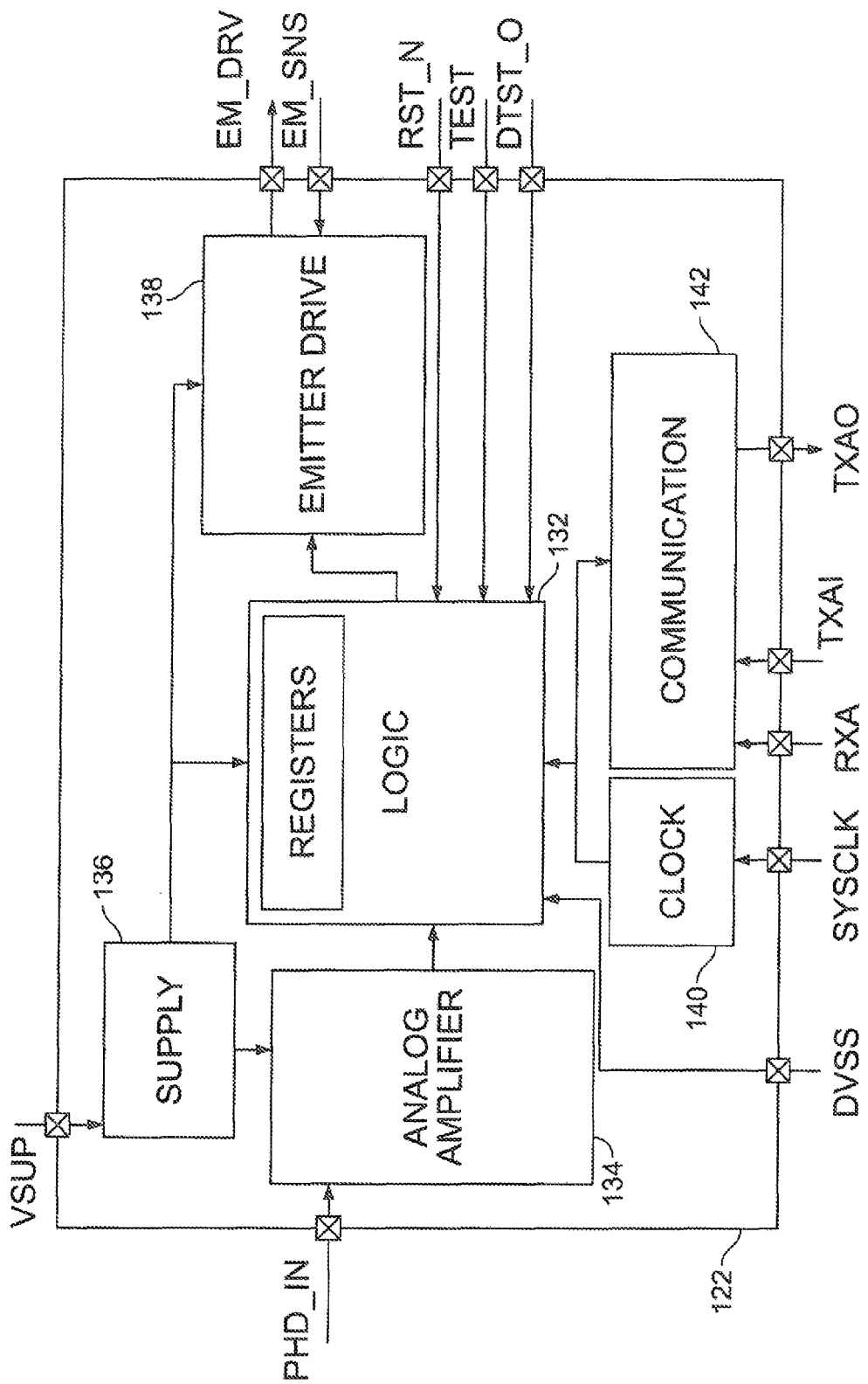
FIG. 4 shows a block diagram of a control element which is part of the optoelectronic component.

FIG. 4 shows a schematic block diagram of the control element 122 according to FIG. 3. As already mentioned above, the control element 122 may be formed by an integrated circuit and may in particular be realized in the form of an application specific integrated circuit, an ASIC, or a field programmable gate array (FPGA) design. ASICs have the advantage of a full-custom capability, lower unit costs and a small form factor, whereas FPGAs have the advantage of a faster time to market and a simpler design cycle. In the following, the control element will often be called "ASIC". However, this does not restrict the control elements only to ASICs.

The control element 112 has analog and digital sections as well as interfacing cells. The analog amplifier 134 is operable to detect the signals measured by the photodiode. Furthermore, the logic section 132 contains the registers which are used for storing the address of the particular control element 122. The clock 140 is used to synchronize all control elements with the microcontroller, run the internal logic, and sample the communication bus starter lines. The internal LED control 138 controls the LED current value by measuring the voltage across the external resistor R1 shown in FIG. 3.

The power supply block 136 generates the voltage for supplying the internal circuitry, such as the digital logic supply and the analog supply. Auxiliary voltages for the bias of the photodiode and the analog ground reference may also he generated here.

The communication block 142 interfaces on one side with the external microcontroller serial bus 124, as shown in FIG. 3, and on the other side with the internal logic 132.

Figure 5:
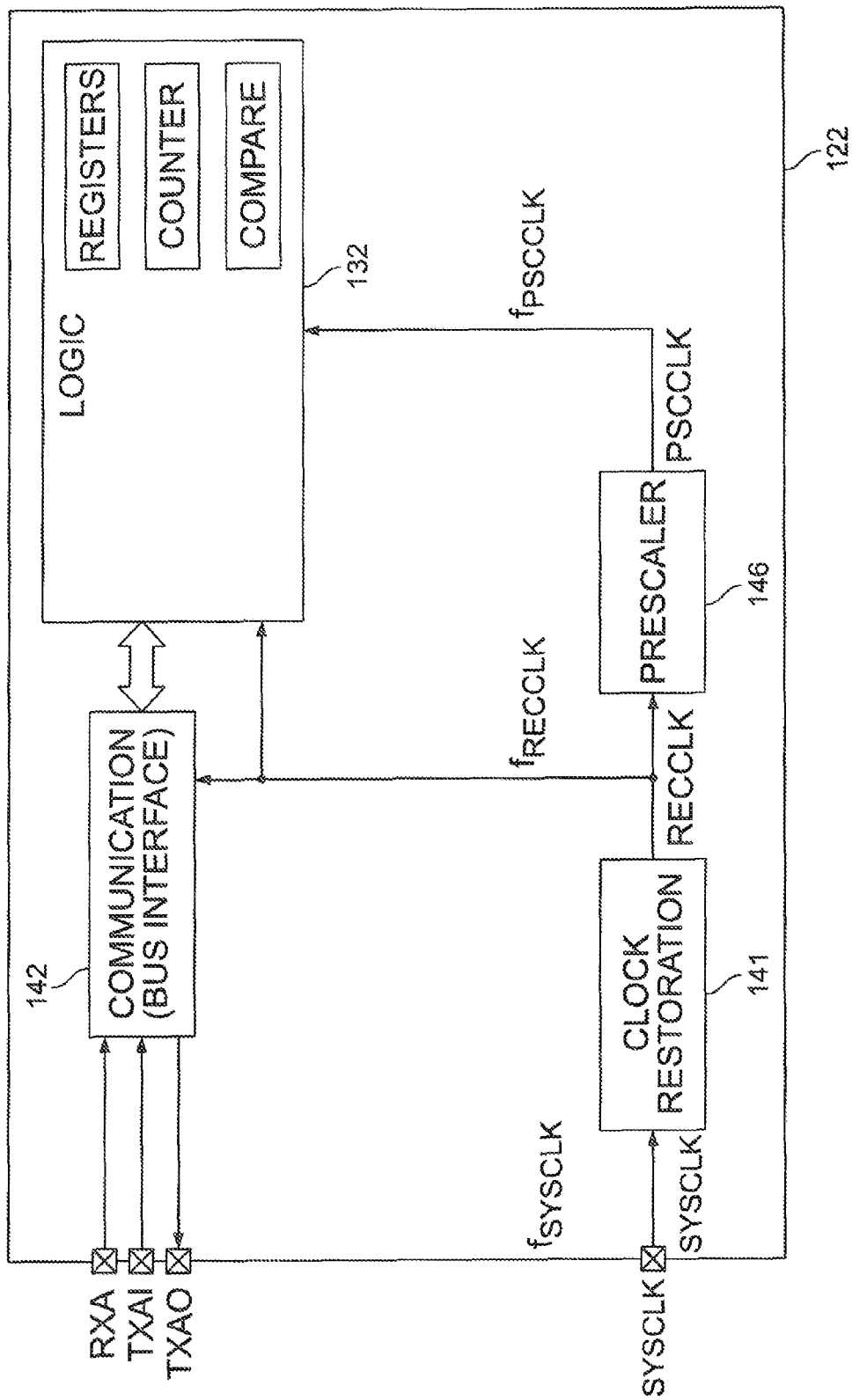
FIG. 5 shows a block diagram of the clock signal processing within the integrated circuit of FIG. 4.

FIG. 5 illustrates the clock related details of the control element 122 in the form of a block diagram. In particular, the control element 122 receives the external clock frequency fSYSCLK via its input SYSCLK. The clock input is used to measure and compare the timings of the sensed beam patterns, to generate correct beam patterns as well as to sequence the operation of the control element 122. The functional block "clock restoration" 141 recovers the clock input signal SYSCLK. According to a particular embodiment, the clock input is a current signal. In the block clock restoration 141 both logic and analog elements are provided. In particular, a transimpedance amplifier is provided for converting the clock current signal to a voltage signal, which is then buffered as the recovered clock signal RECCLK. This allows to minimize the voltage change over time (dV/dt) on the clock input pin by using a current signal.

The clock restoration block 141 outputs a recovered clock signal RECCLK with the same frequency as the input frequency: fRECCLK=fSYSCLK.

As indicated in FIG. 5, the communication interface 142 works with the frequency fRECCLK. Furthermore, the recovered clock signal is also input for a prescaler 146. This prescaler 146 is operable to generate a divided internal clock frequency having half, a quarter, or an eighth part of the recovered clock frequency. However, the prescaler 146 can also be set to leave the frequency undivided. The prescaler output frequency fPSCCLK is dependent on the prescaler configuration. The pulse pattern recognition, the timing measurements and so on are computed proportional to the divided clock frequency fPSCCLK, which according to an advantageous embodiment is half of the recovered clock frequency fRECCLK. For a continuous system clock of 0.8 to 4.8 MHz, the prescaler frequency would be between 0.4 and 2.4 MHz. However, it is clear that other values can of course also be implemented.

Before entering into more details on the synchronization steps, in the following first some basic explanations regarding the particular pulse patterns used according to an advantageous embodiment of the present invention are given.

Figure 6:
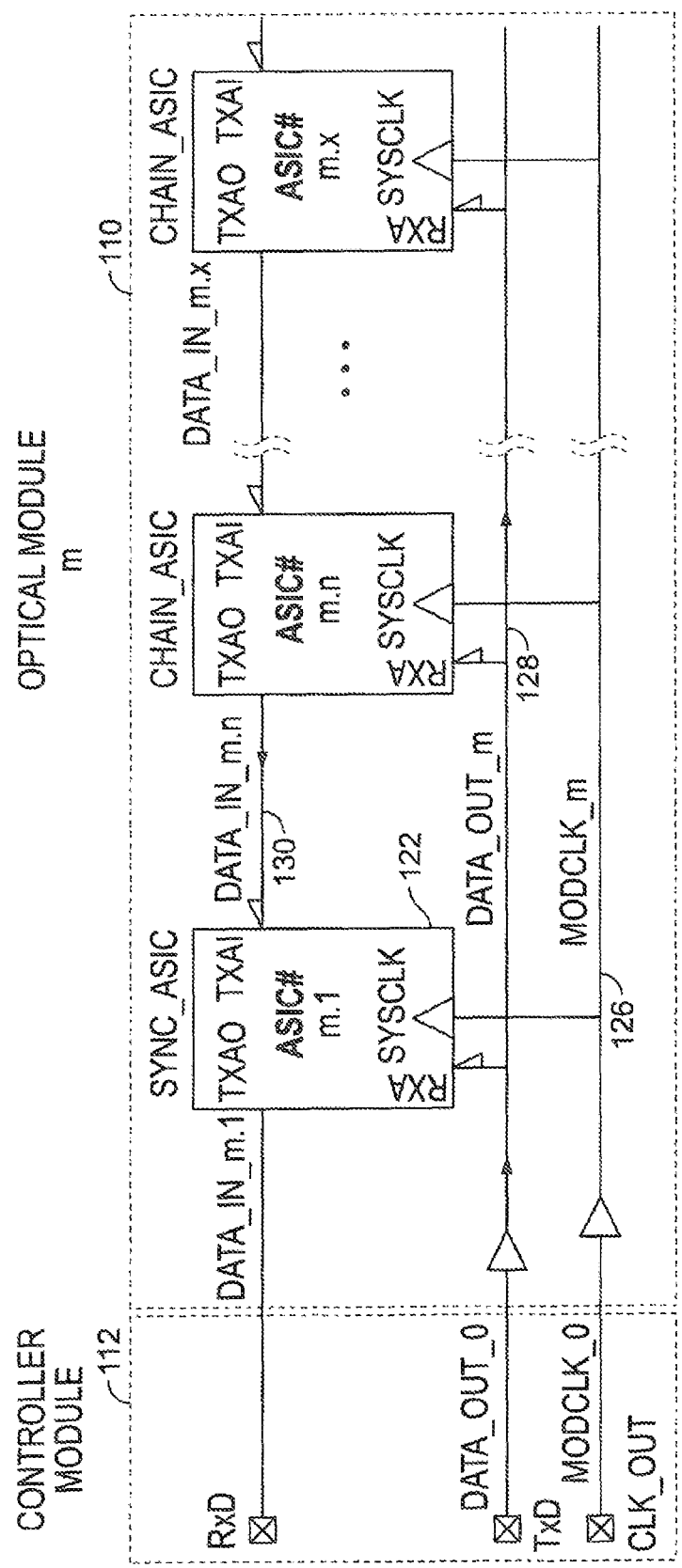
FIG. 6 shows a schematic representation of an optical unit according to the present invention.

With respect to FIG. 6, the communication between a particular optical module 110 and the controller module 112 is illustrated. In this figure as well as in the following figure the particular embodiment of using an ASIC as the control element 122 is considered. However, as outlined above, any other suitable technique for realizing a control element 122 can be employed here as well.

In order to allow that the ASICs are operated in such a multiple ASIC system, each ASIC is assigned a unique identifying address which is stored in a bank of registers, and the ASICs respond to system commands via a shared serial bus. In response to the commands, the ASIC replies via a shared single-bit serial bus with an arbitration mechanism.

Furthermore, the plurality of ASICs are interconnected by means of at least one serial daisy chain line which in the embodiment shown in FIGS. 3 and 6 is provided by the data-in bus communication line 130.

Figure 7:
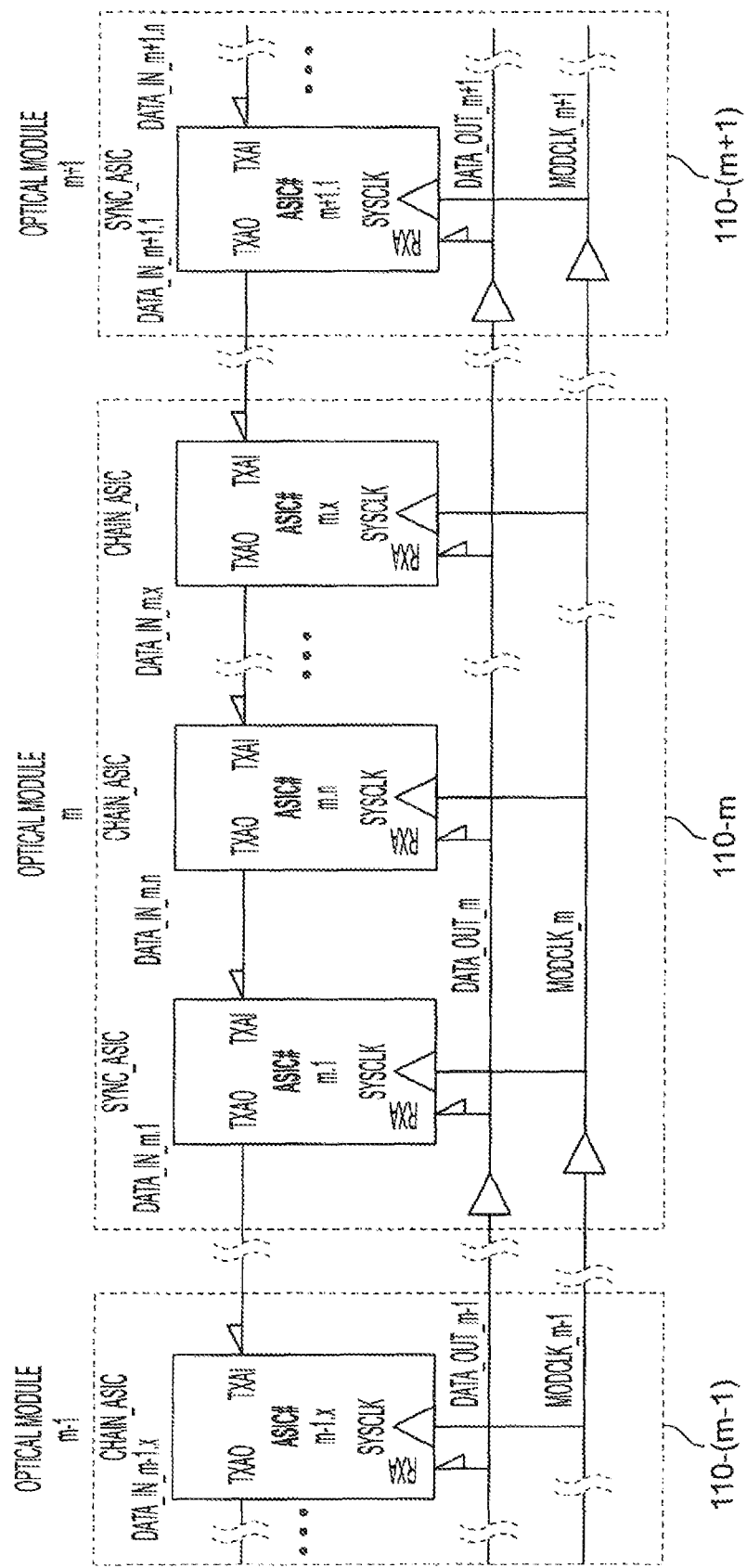
FIG. 7 shows a schematic representation of an optical unit according to a further embodiment.
Figure 8:
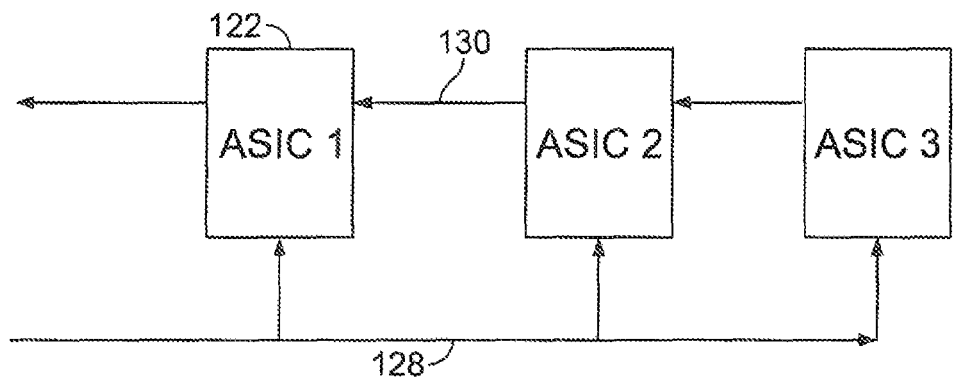
FIG. 8 shows a schematic representation of a first bus structure.
Figure 9:
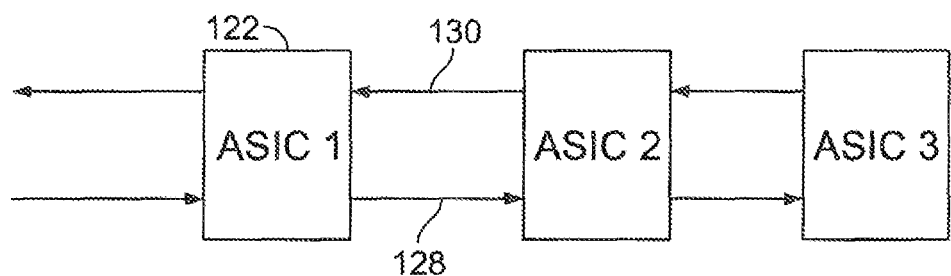
FIG. 9 shows a schematic representation of a second bus structure.

FIG. 7 shows the case where a plurality of optical modules 110 is provided instead of the single optical module shown in FIG. 6. The principles of the present invention may of course be employed for the embodiment shown in FIG. 7 in the same way as for a case where only one module 110 is present.

Figure 10:
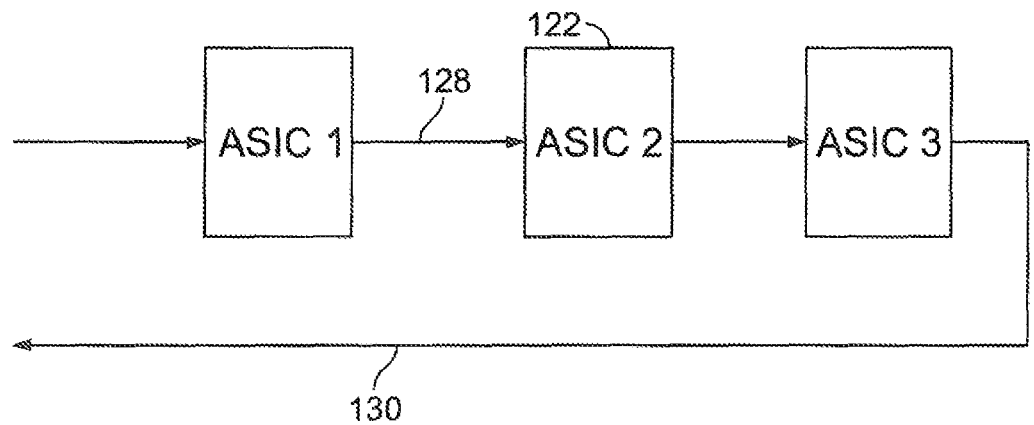
FIG. 10 shows a schematic representation of a third bus structure.

However, there are several other possibilities of interconnecting the ASICs with each other and FIGS. 8 to 11 depict alternative bus structures. Firstly, FIG. 8 essentially summarizes the bus topology used for the arrangement of FIG. 7. In particular, the data-out line 128 connects to ASICs 122 in parallel, whereas the data-in line 130 which is directed towards the controller is a serial connection leading through all the ASICs 122. Alternatively, also the arrangement according to FIG. 9 could be chosen, where both directions of the data transfer are leading through the ASICs 122 in series. According to a further alternative, the ASICs 122 can also be connected to each other in the form of a single-direction daisy chain which essentially represents a ring structured bus topology, as this is depicted in FIG. 10.

Figure 11:
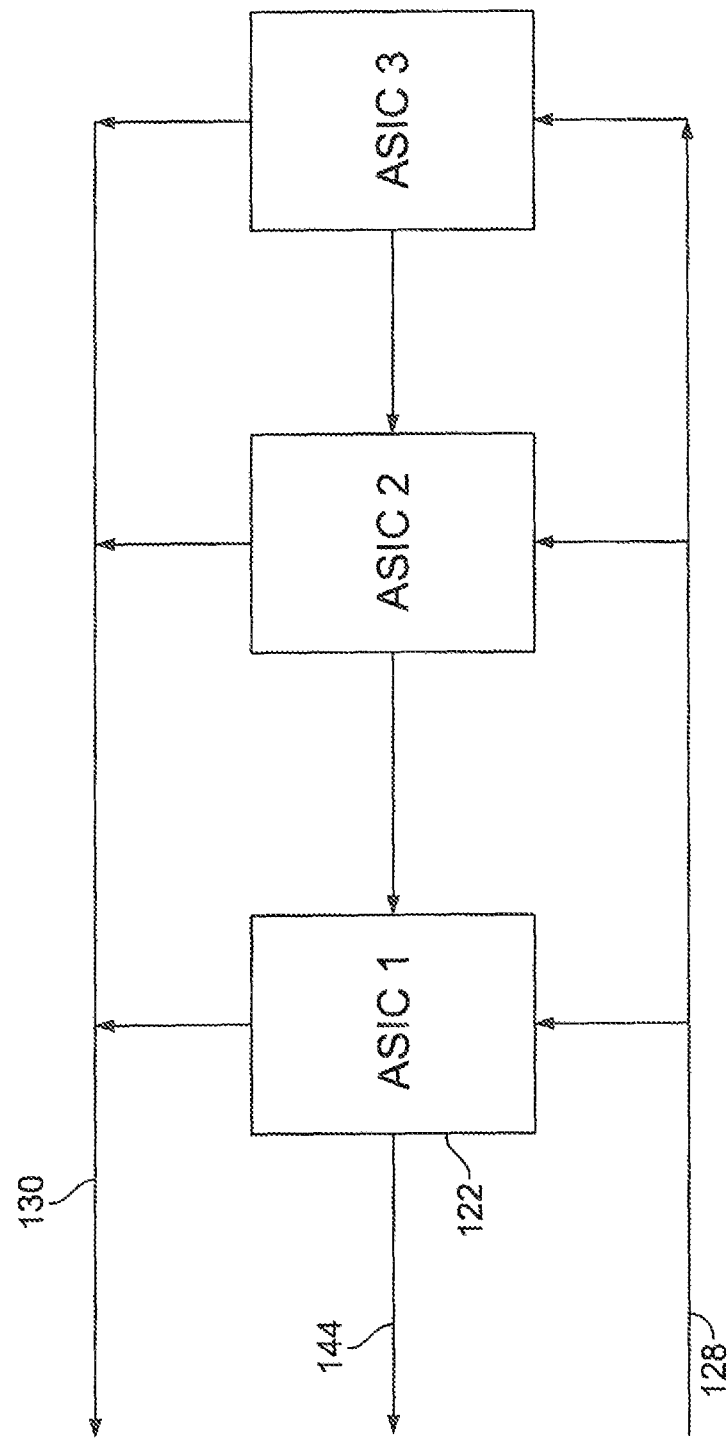
FIG. 11 shows a schematic representation of a fourth bus structure.

At least one serial connection is advantageous for assigning individual addresses to each of the ASICs 122. However, the serial connection does not necessarily have to be one of the data lines 128 or 130, but may also be realized in the form of an additional enable line 144 used only for the address distribution. FIG. 11 shows a topology where the data-out line 128 is in parallel as well as the data-in line 130 and wherein an additional daisy chain 144 connects the ASIC 122 in series.

Figure 12:
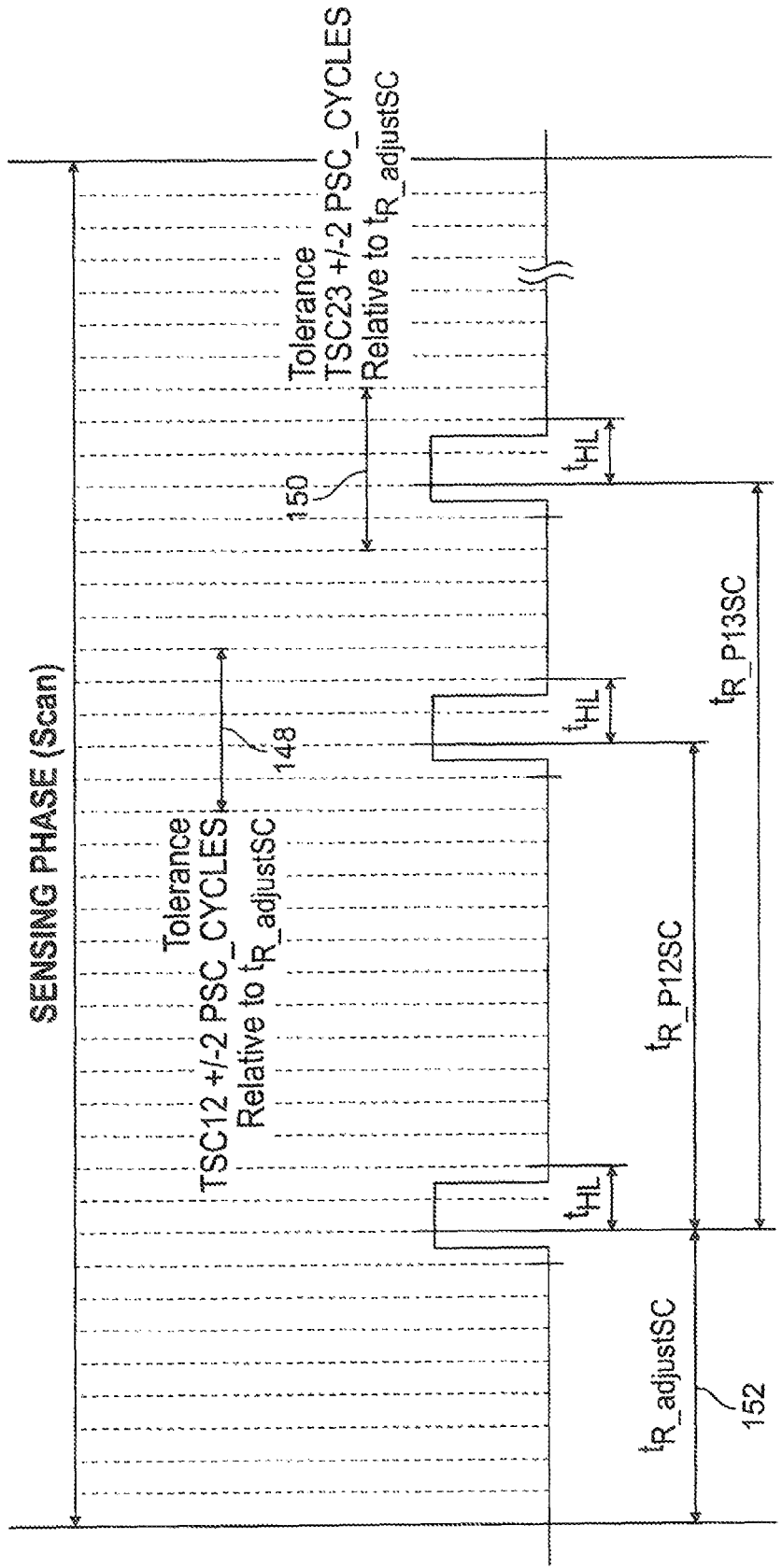
FIG. 12 shows a timing diagram for illustrating tolerances for sensing a pulsed beam pattern.

According to the present invention, emitted light pulses are expected within a particular time window. FIG. 12 illustrates a particular pulse pattern which may for instance be used for a scan or sensing procedure.

By measuring the timing position of a pulse pattern in a particular receiving window a resynchronization on every beam is feasible. By accordingly making an adjustment of the synchronization at every beam, clock differences due to temperature variations and overtime can be compensated. To this end, the emitted radiation according to the present invention has the structure of a particular pulse pattern and there are different patterns which can be used to distinguish between normal scan pulses during the regular scan operation and a synchronization pattern that is only used for synchronizing the two optical units with respect to each other. In order to perform a communication via the optical channel, also different pulse patterns can for instance be used for a start signal, an acknowledge signal or the like. The pulse patterns emitted by the optoelectronic components can also have a specific coding depending on the particular optical units which the optoelectronic components belong to. This is an efficient way of eliminating disturbances due to other light curtains which are mounted in the direct vicinity.

The pattern in the particular embodiment of FIG. 12 is formed by three pulses with two different time distances which are expected within a particular time window, indicated by the sensing phase. FIG. 12 gives the particular tolerances that have to be observed for correctly detecting these pulses. Within the sensing phase window two further windows 148 and 150 can be defined for measuring a second and third pulse from the opposing optical unit. For synchronizing the two optical units to each other, the timing information on when the pulses have been received can be determined and stored by the respective receiving control element 122.

Of course, any other suitable pulse patterns can also be employed if needed. Further, any desired number and type of signals can be encoded with a particular pulse pattern.

In particular, tR_adjustSC can be used as a time stamp information 152 on when the pulse pattern has been sensed within the sensing window. The time span tHL defines a maximum allowable pulse width which is necessary for ensuring that the correct pulse pattern has been detected. The time stamp information 152 can be used for synchronizing further operations of the optical unit having received these signals. The times tR_P12SC and tR_P13SC define the distance between the first and second or third pulse respectively. They can be set individually before taking the light curtain into operation. Any other suitable beam coding may of course also be used.

After having received a particular pulse pattern within the sensing phase, the receiving control element 122 in general has at least two pieces of information which can be extracted from the sensing procedure: Firstly, the result of the pattern recognition as such leads to a status information For instance, the particular pulse pattern shown in FIG. 12 may contain the information that a synchronization step is now to be performed. Secondly, the time stamp information 152 contains the information about the timing of the emitting optoelectronic component with respect to the internal timing of the particular detecting optoelectronic component.

Figure 13:
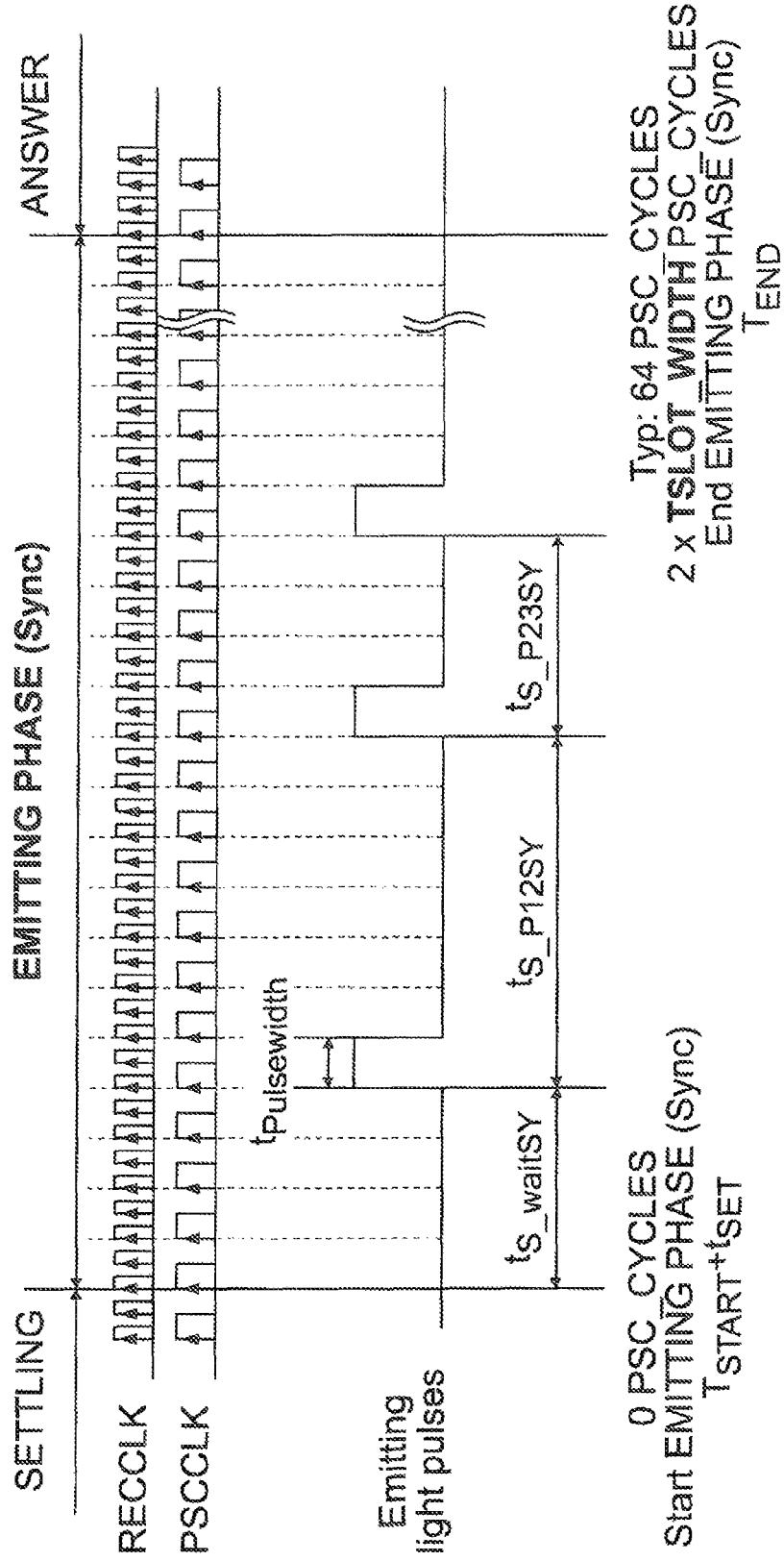
FIG. 13 shows a timing diagram for illustrating a pulse pattern during a synchronization step.

FIG. 13 shows a timing diagram of the emitting phase for the case that a synchronization pulse pattern is to be emitted.

FIG. 13 also shows the two clock frequencies of the recovered clock RECCLK and the prescaler clock PSCCLK which has half the frequency compared to the system clock. The pulse width of the emitted light pulses may for instance he defined by two rising edges of the recovered clock for a high signal. Of course, also broader pulses can be used.

Figure 14:
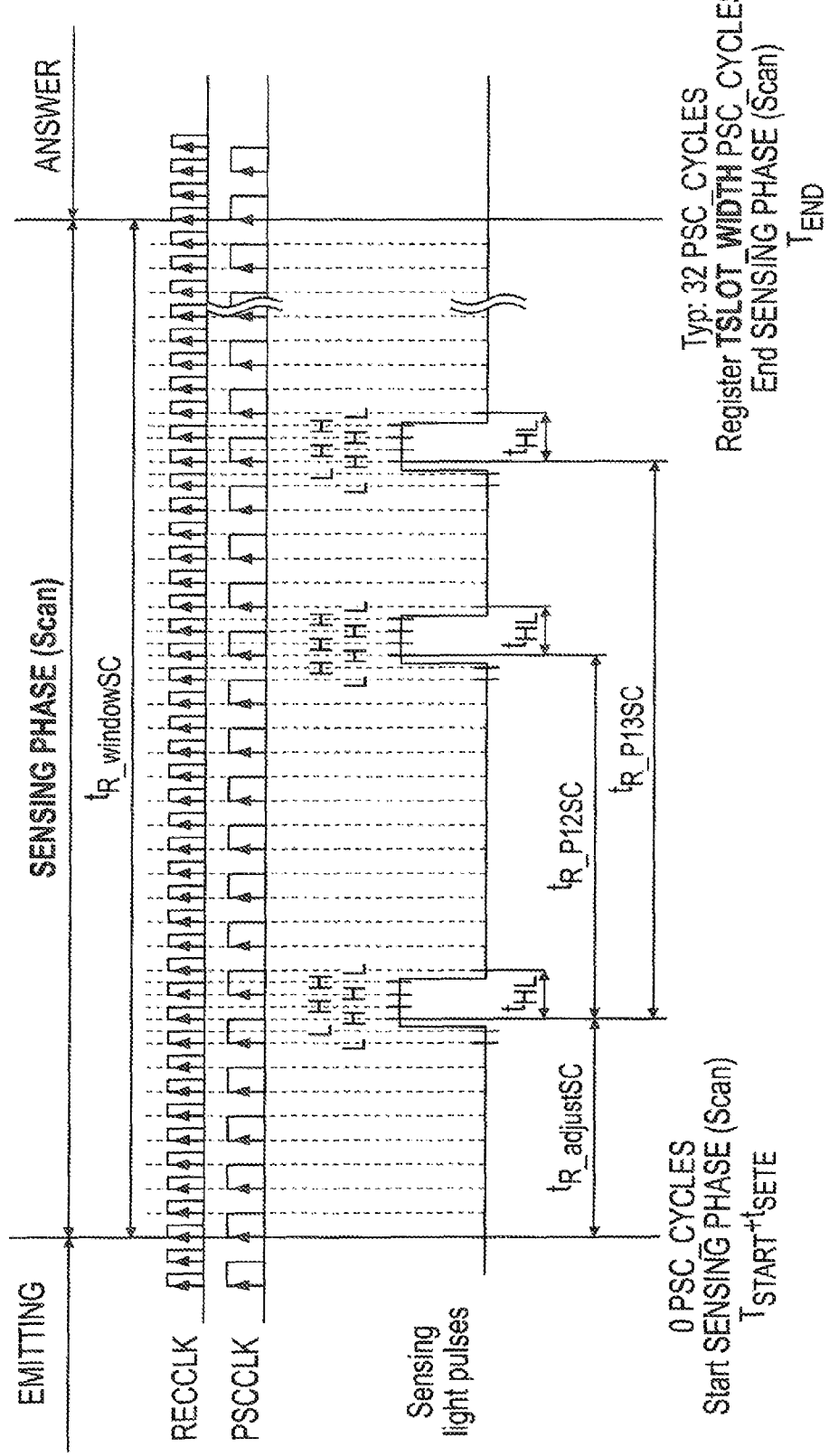
FIG. 14 shows a timing diagram for illustrating a sampling step during a scan phase.

FIG. 14 shows the timing diagram for the corresponding sensing element. The sensing phase has a duration of tR_windowSC which typically amounts to 32 prescaler cycles. When a first pulse is sensed, the time between the start of the sensing window and the first rising edge of the recovered clock is determined and stored as the time stamp information. The timing of the sensed light pulses will be compared with the configured parameters in the bank of registers and the measured value has to lie within the specified range.

In the following, several possible situations regarding the timing of the incident light pulses in reference to the sensing time window on the receiving side will be explained.

Figure 15:
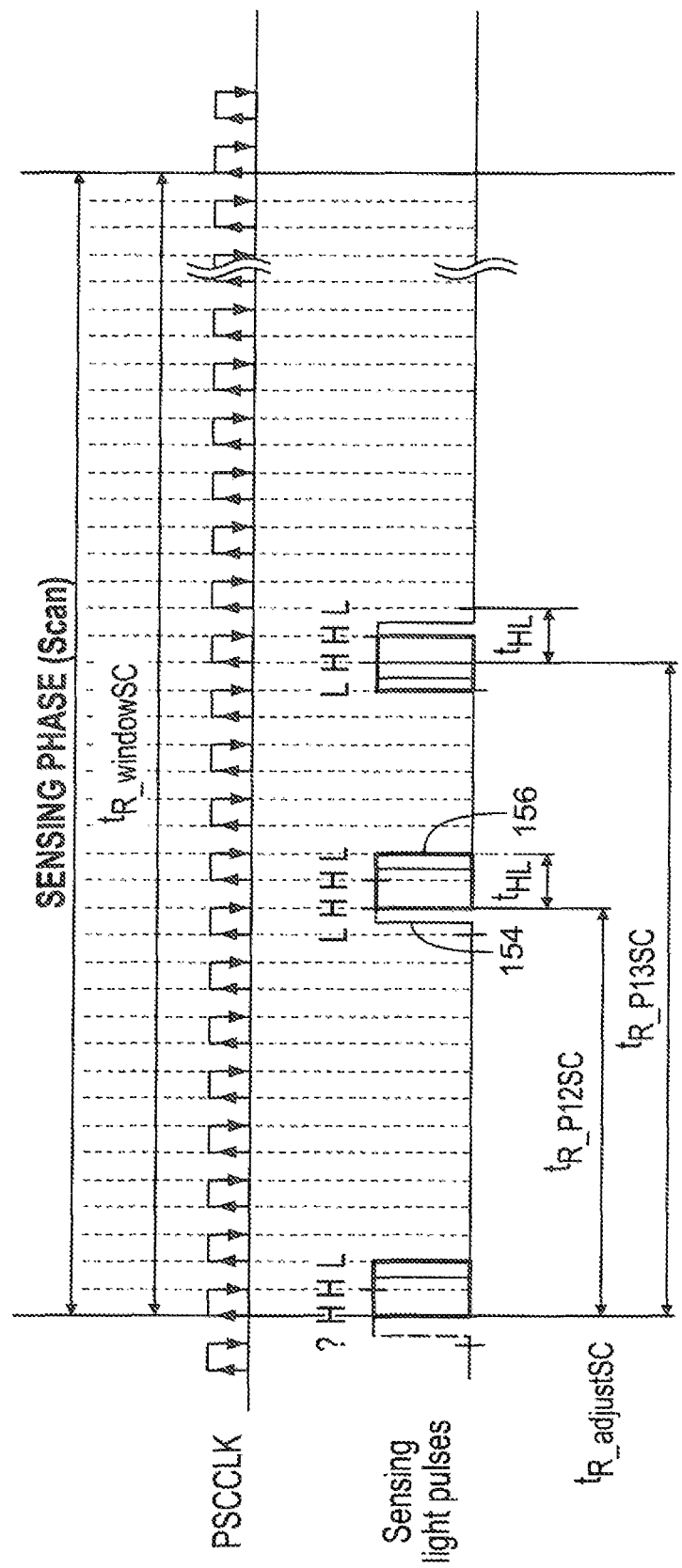
FIG. 15 shows a timing diagram illustrating the detection of a complete light beam pattern.

FIG. 1.5 shows an example of the earliest correct light beam pattern that may be sensed. For this case, in the control element of the respective optoelectronic component, it will be registered that a pattern has been correctly recognized. In FIG. 15, reference numeral 154 signifies the actual incident light pulses, whereas reference numeral 156 signifies an expected light pulse pattern which is generated upon detection of a light pulse at the beginning of the sensing window.

Figure 16:
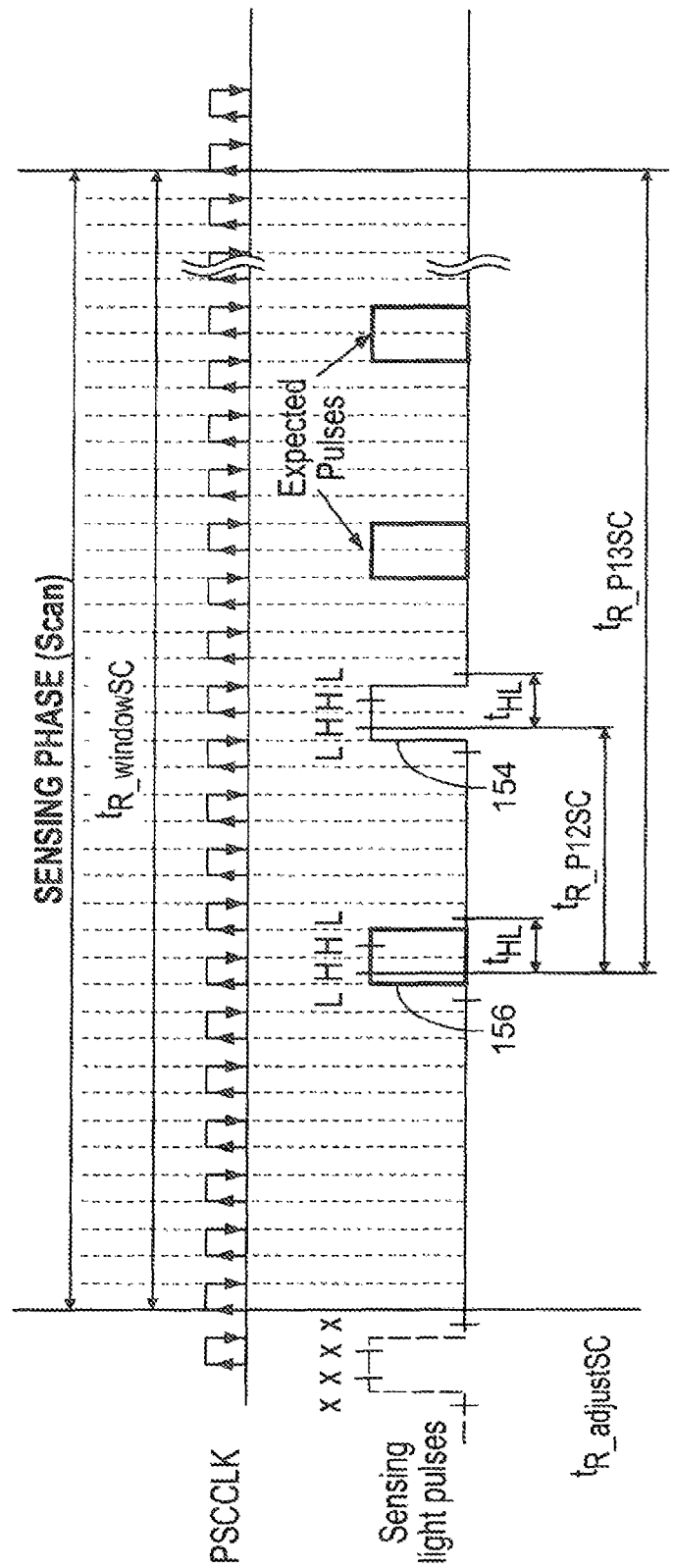
FIG. 16 shows a timing diagram illustrating the situation where the emitted light pulses are too early.

The case where the first pulse of the pulse pattern is received earlier than the start of the receiving window is shown in FIG. 16. Here, only the second light pulse of the incident pulses 154 leads to an expected pulse pattern 156 which, however, now does no longer coincide with the actually measured pulses. In particular, the measured time tR_P12SC until the second pulse is registered, is too short, whereas the time when the third pulse is received is much too long, because the third pulse never comes and tR_P13SC is a default value set by the end of the sensing window.

Figure 17:
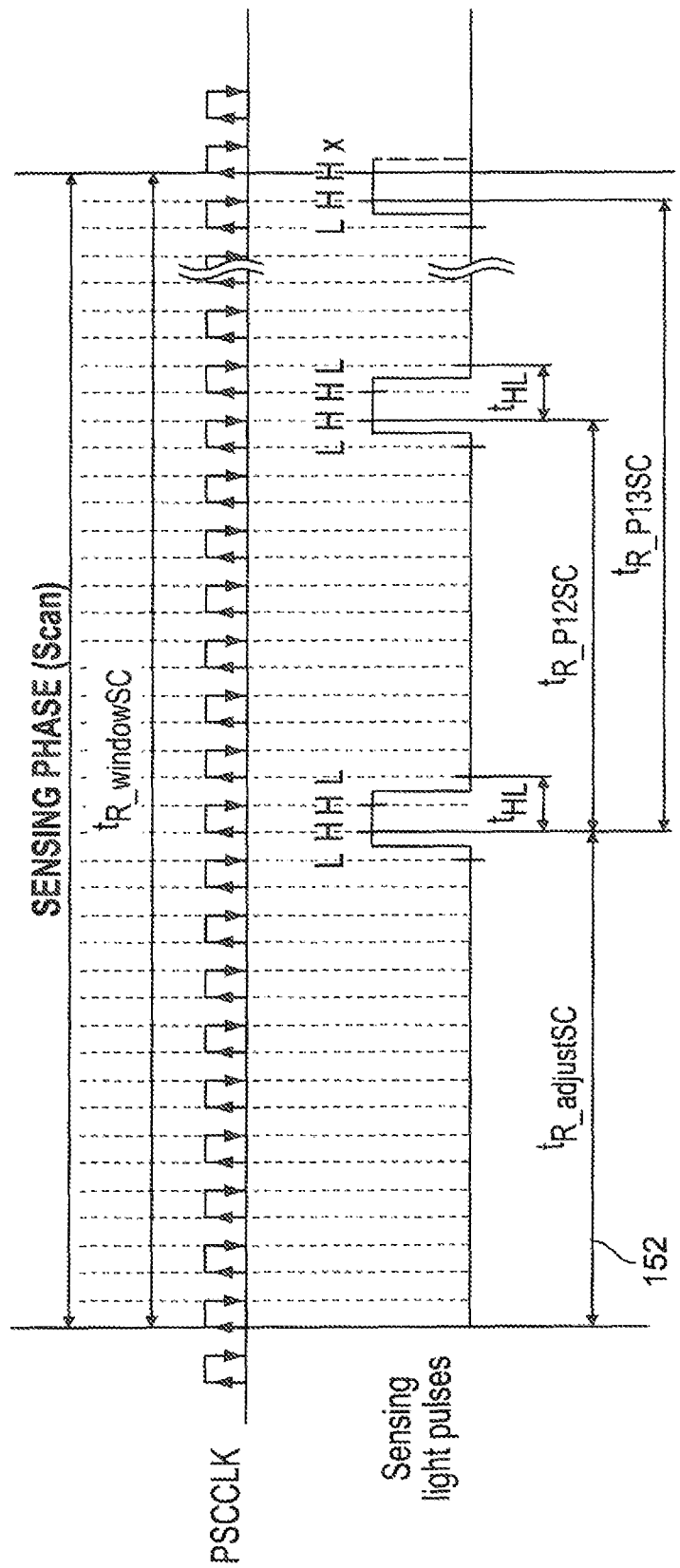
FIG. 17 is a timing diagram illustrating another correctly detected light beam pattern.

FIG. 17, on the other hand, shows the latest possible arrival of the pulse pattern for detecting a complete pattern within the time frame of the receiving window. The time stamp information 152 is determined by the time difference between the beginning the receiving window and the detection of the first pulse.

Figure 18:
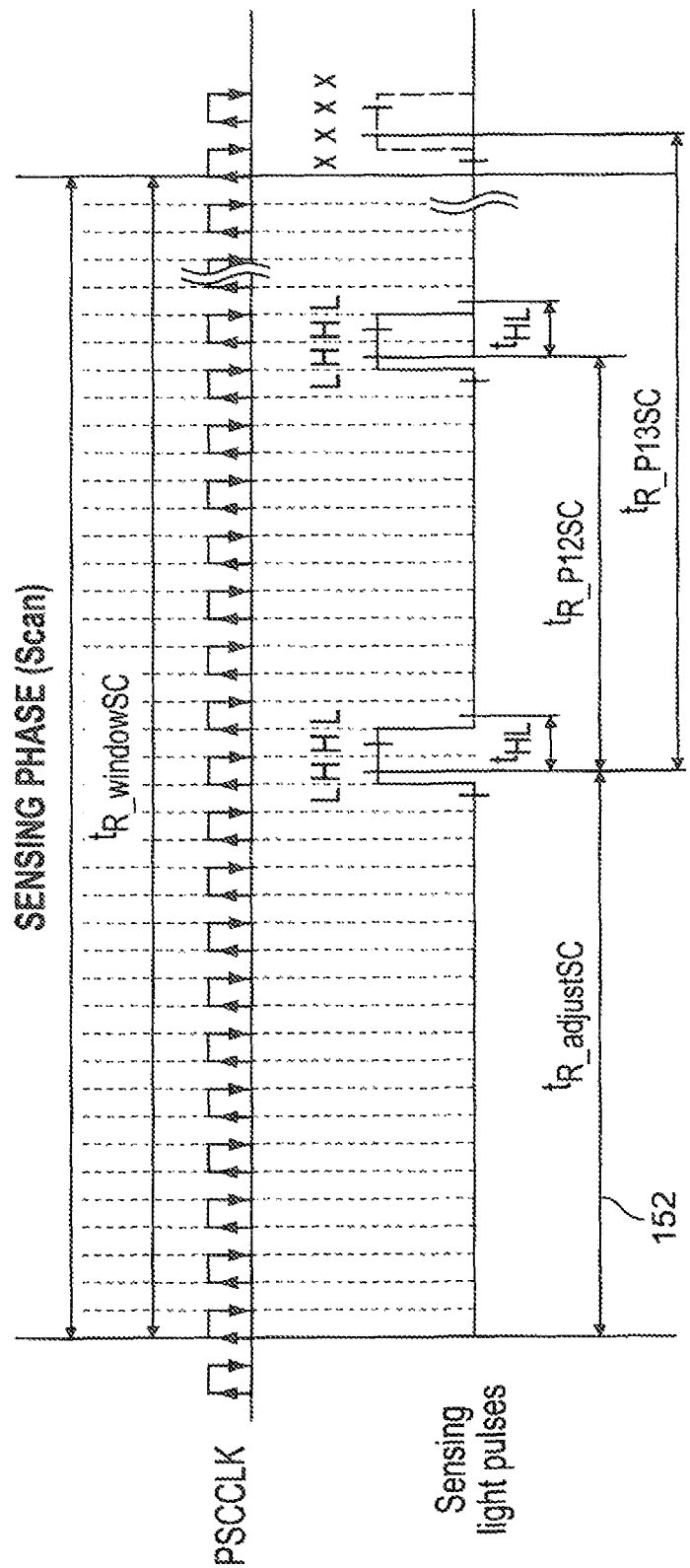
FIG. 18 is a timing diagram illustrating a situation where the sensed light beam pattern is too late.

In contrast thereto, for cases where the incident pulses are later than shown in FIG. 17, not the complete pulse pattern can be evaluated as this is depicted in FIG. 18. However, still the time stamp information 152 can be derived from this measurement and a respective synchronization can be performed accordingly.

Figure 19:
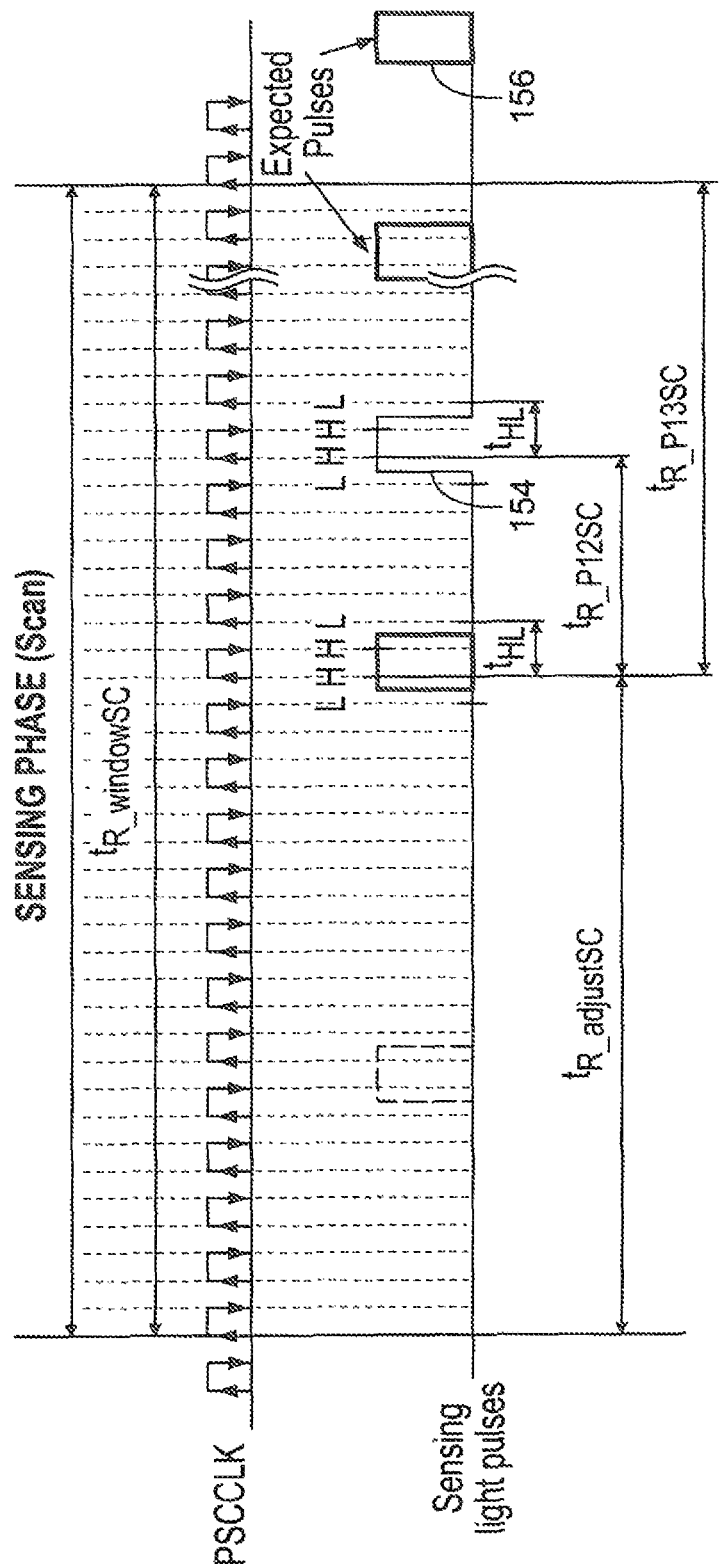
FIG. 19 is a timing diagram illustrating the situation where a pulse is missing.
Figure 20:
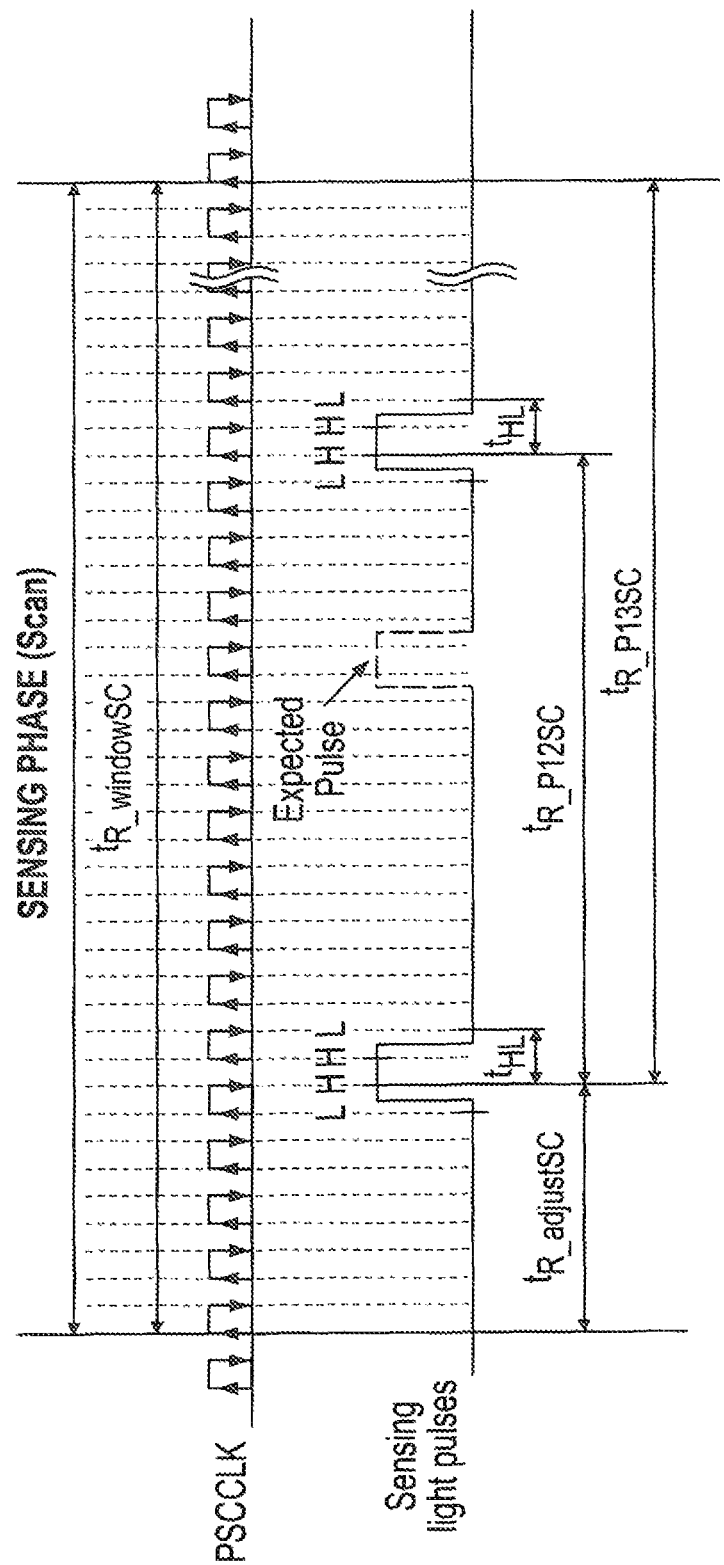
FIG. 20 is a timing diagram illustrating the situation where another pulse is missing.
Figure 21:
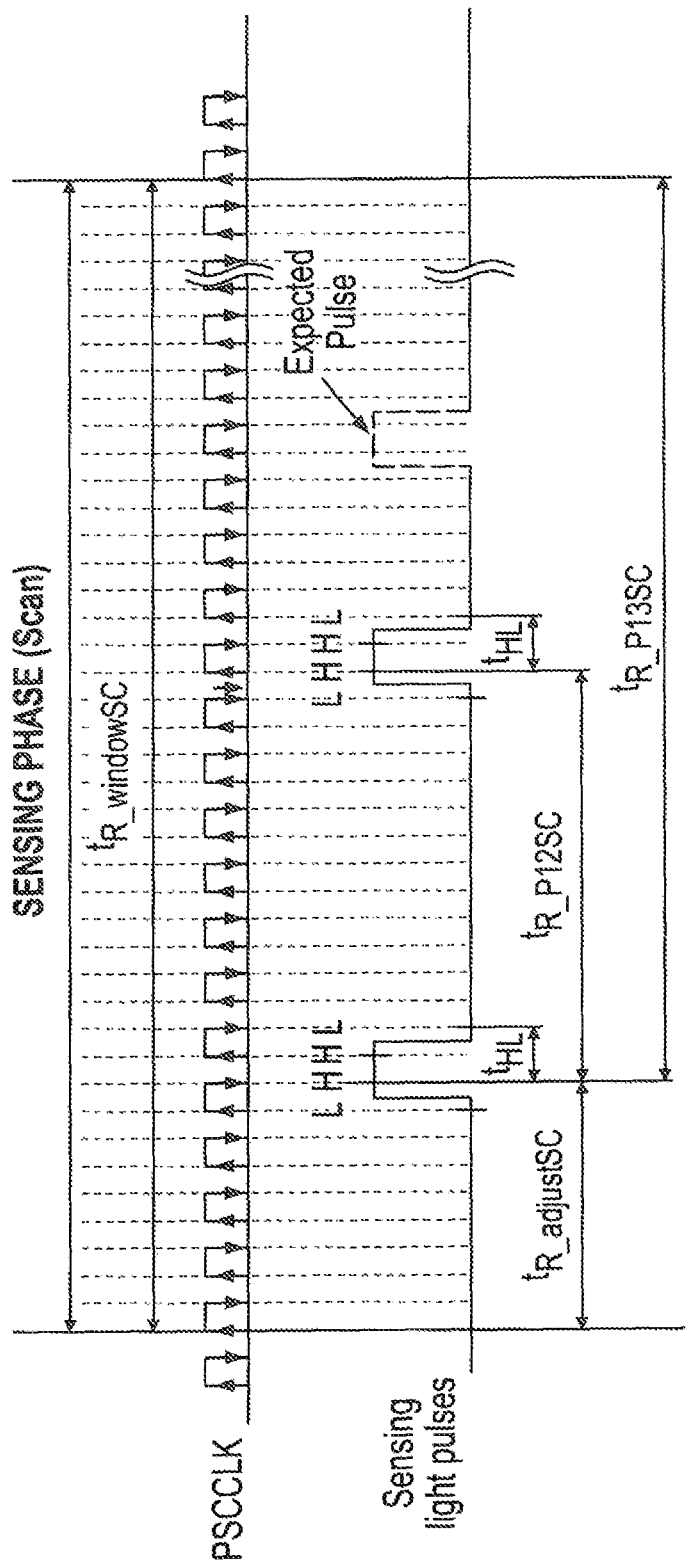
FIG. 21 is a timing diagram illustrating a situation where the last pulse is missing.
Figure 22:
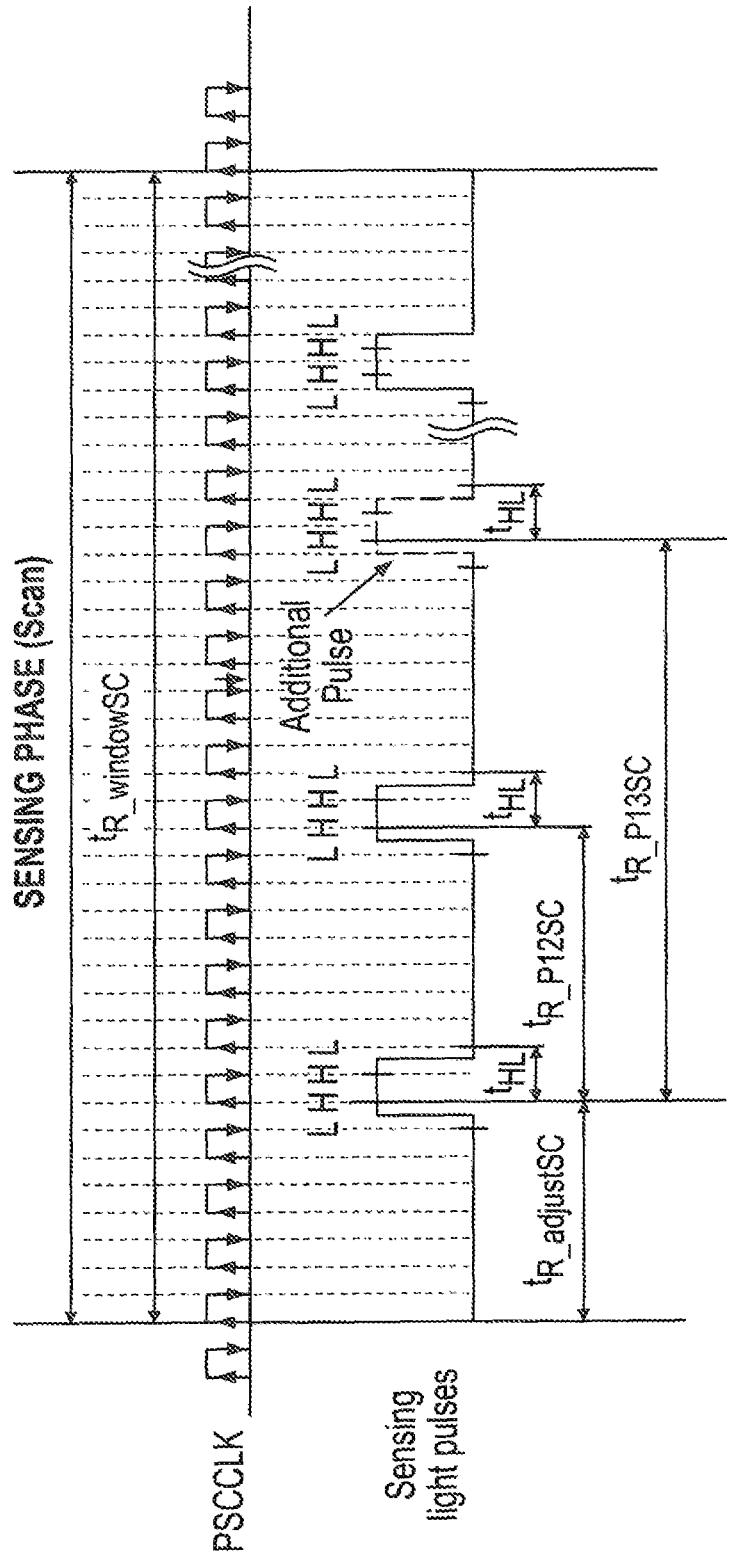
FIG. 22 is a timing diagram illustrating a situation where an additional light pulse is detected in the pattern.

The specific pulse pattern allows to distinguish between situations where the incident light pulses are only time shifted with respect to the sensing window from situations where pulses are missing. FIG. 19 illustrates the case where the first pulse is missing and only the second and third pulses are detected within the sensing timeframe. In such a situation, not a simple synchronization signal is sent to the controller, but an error message can be output. The same is valid for the cases where either the second or third pulse is missing as depicted in FIGS. 20 and 21. Another case where not a simple time adjustment is performed but where an error is registered, is shown in FIG. 22, where an additional pulse as shown in FIG. 22, an additional fourth pulse is detected and moreover the complete pattern, and in particular the time between the first and second pulse, do not coincide with the expected values. Hence, again an error message is generated.

Figure 23:
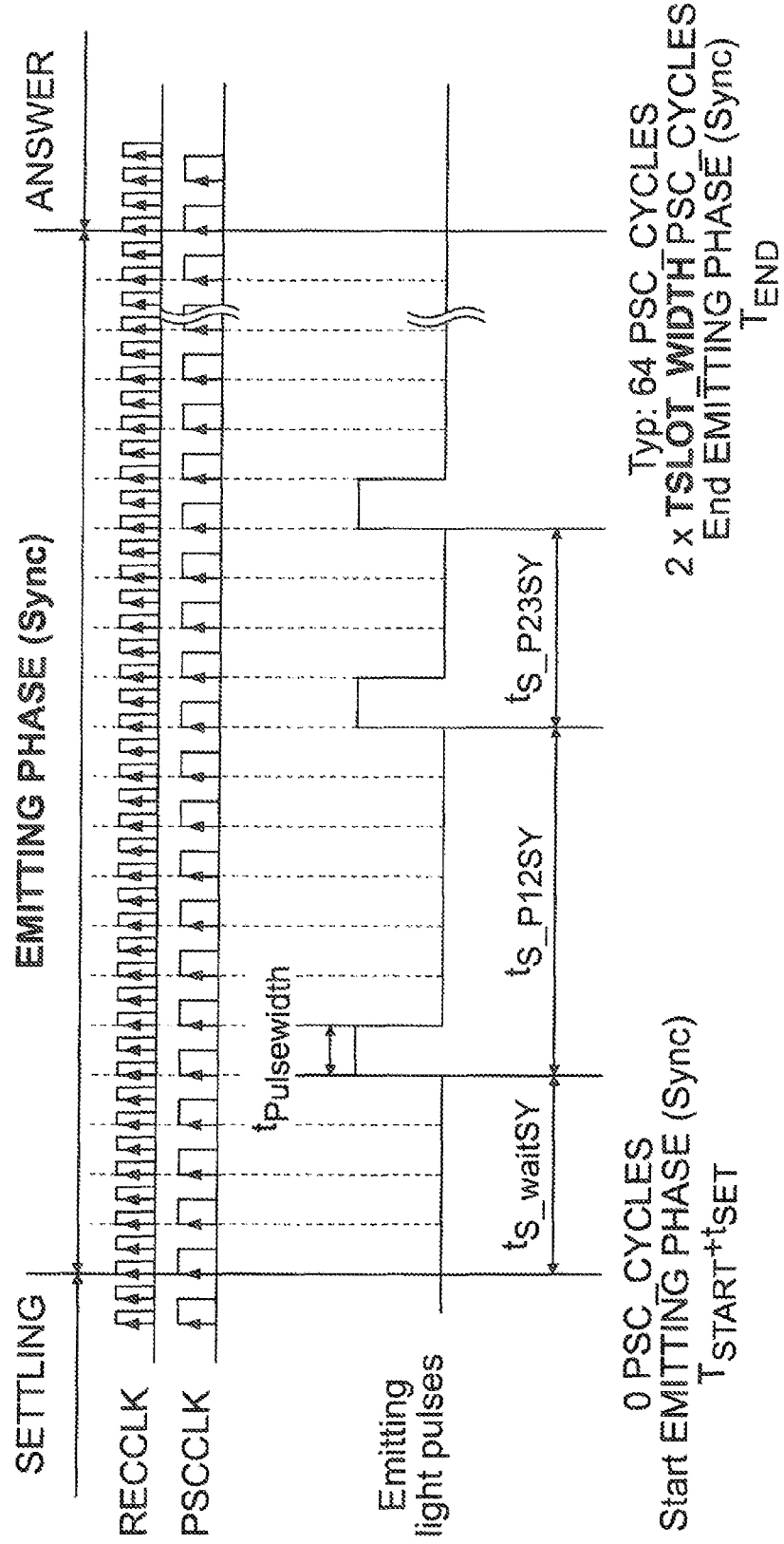
FIG. 23 is a timing diagram illustrating a synchronization signal as emitted.

FIG. 23 illustrates the particular timings which are defined for emitting a synchronization pulse pattern in the exemplary embodiment also used before. Of course, also any other suitable pulse patterns can be used as a synchronization pulse pattern. In particular, more pulses or less can be used and also the pulse width can be different and does not have to be the same for all pulses.

Upon receiving a SYNC command from the controller 111, a particular optoelectronic component emits in a predefined emitting phase the pulse pattern as shown in FIG. 23. The particular times arc given in the parameters of the registers.

Figure 24:
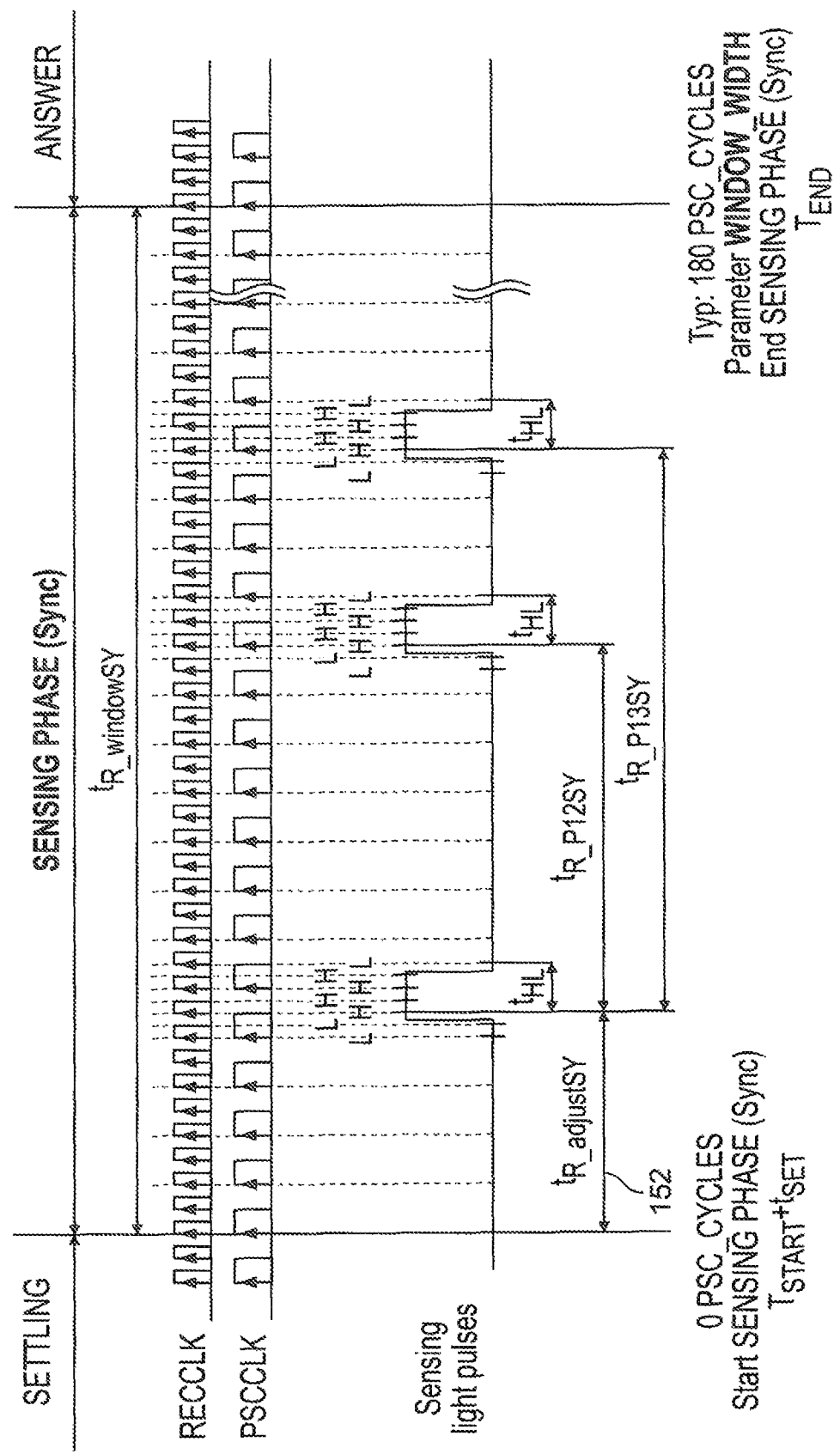
FIG. 24 is a timing diagram illustrating the sensing of the synchronization pulses.

The opposing optical unit samples the emitted synchronization pulse pattern ideally within its sensing phase window, as shown in FIG. 24. The different measured timing values are used for recognizing whether a correct pattern has been received as illustrated before. The time stamp information 152 can be used for performing an adjustment between the timings of the first and second optical unit in order to synchronize same. As explained before, this is, of course, only done in case that the correct synchronization pattern is detected somewhere within the sensing window. The timing and signal flow within one optical unit for the synchronization will be explained in the following, with reference to FIG. 25. As an example, the timing of the signals of the microcontroller is shown when interacting with two particular ASICs. One, for which the command is intended (ASIC# m.n) and another one for which the command is not intended (ASIC# m.n+1).

Figure 25:
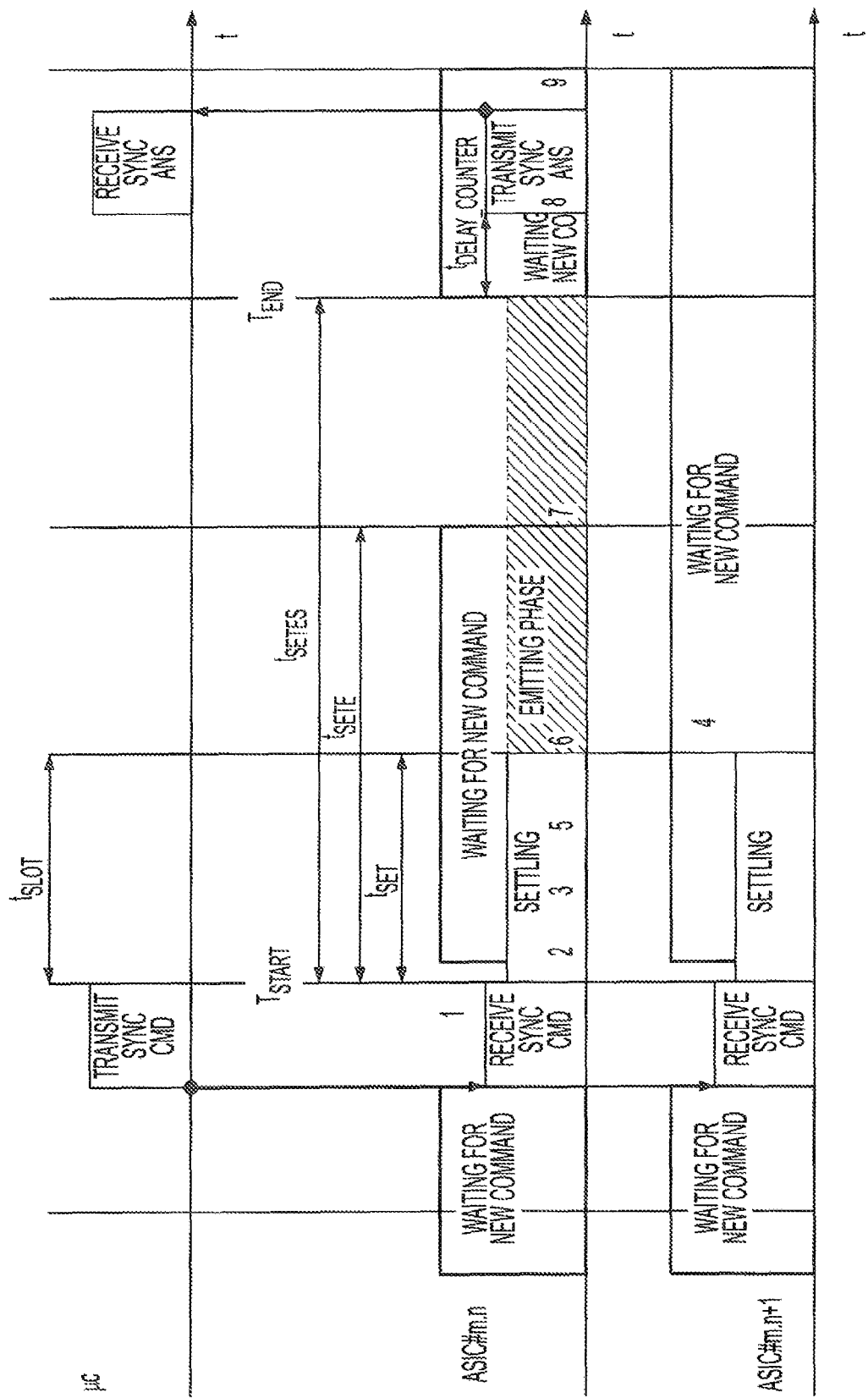
FIG. 25 is a timing diagram illustrating the communication between a control unit and the various control elements during a synchronization step.

As shown in FIG. 25, the microcontroller sends a SYNC command on the bus which is received by all ASICs connected to the bus. The ASICs are all in a mode where they are waiting for a new command, as indicated by FIG. 25. They all receive the SYNC command, but only the ASIC that is intended to send a synchronization signal to the opposing optical unit reacts to this command. As shown in FIG. 25, the ASIC# m.n+1 stays in the waiting status after the settling time, whereas the active ASIC# m.n enters an emitting phase after the settling phase has passed. Once finished with emitting the SYNC pulse pattern according to the transmitted parameters and the configured timing, the ASIC# m.n sends an answer to the bus master µC after a further specified delay time and is then ready for a new command. According to the present invention, an individual address which is unique for each ASIC is provided and leads to the distinction whether the receiving ASIC decodes the particular SYNC command and acts accordingly or just waits for a new command on the bus.

Figure 26:
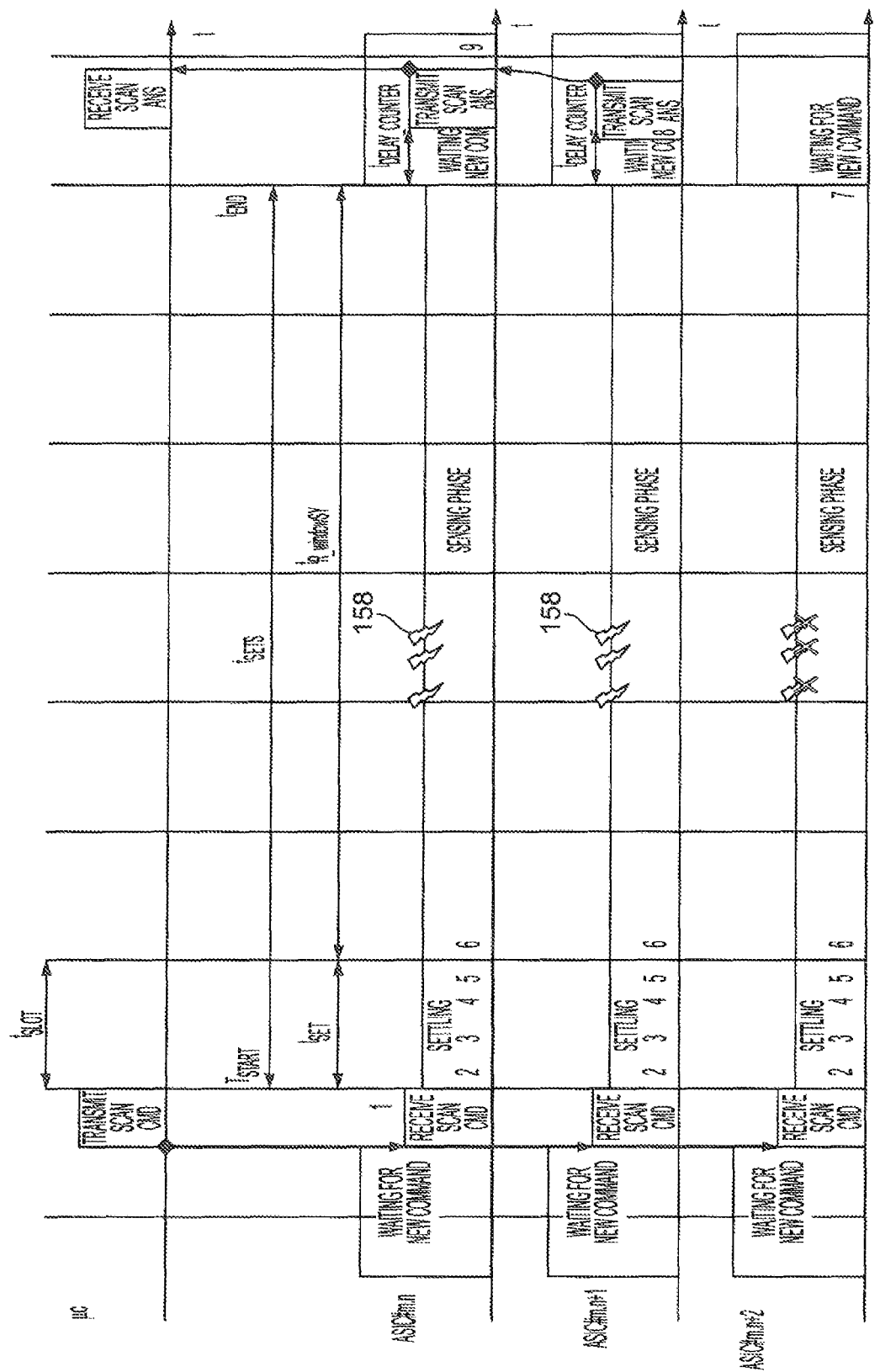
FIG. 26 is a timing diagram illustrating a timing of a sensing phase.
Figure 27:
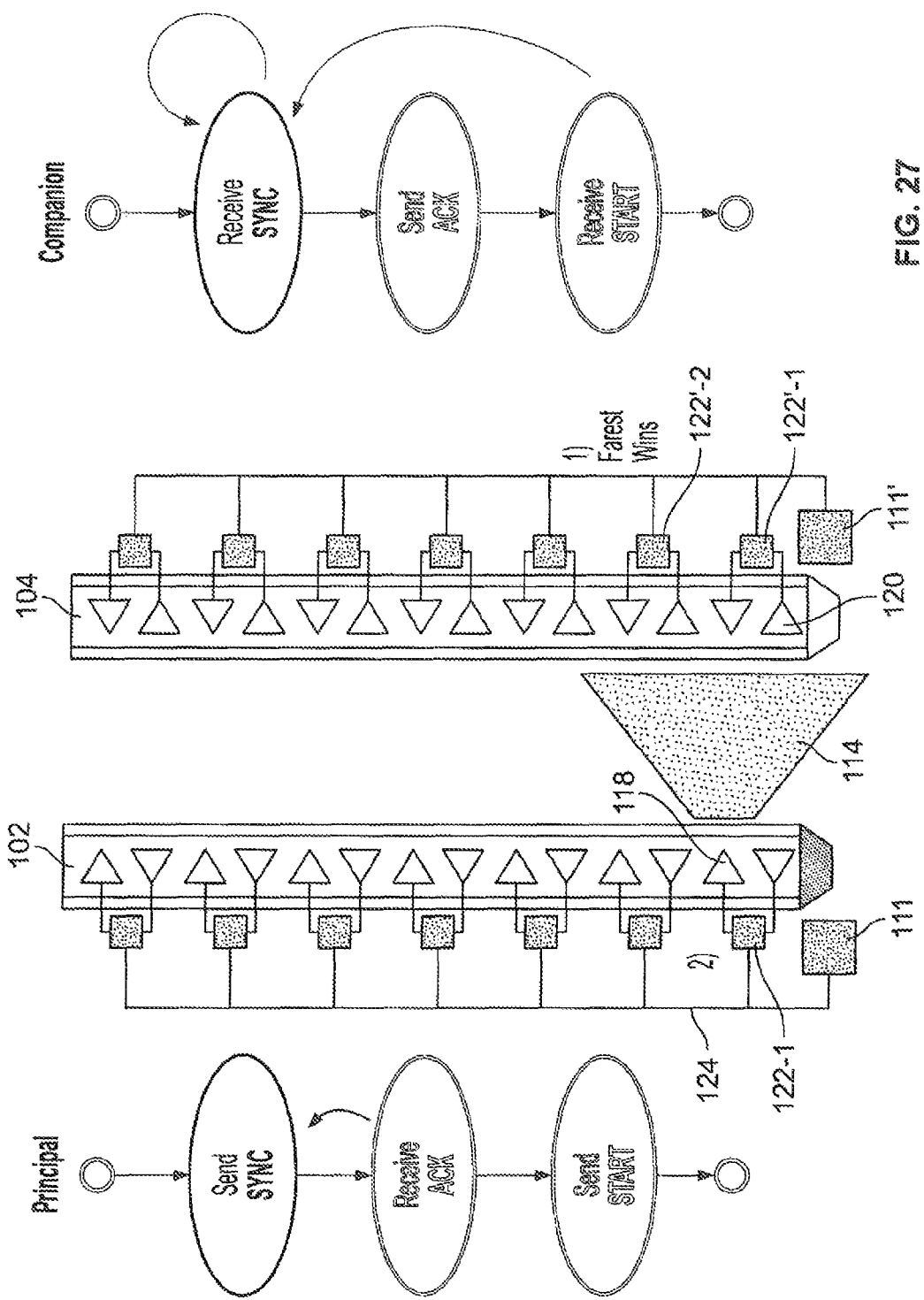
FIG. 27 shows a schematic representation of the synchronization procedure illustrating a first step.

FIG. 26 deals with the signalling on the sensing side where a SYNC command initiates the sensing phase. As shown in FIG. 26, the ASIC# m.n and ASIC# m.n+1 both receive a synchronization signal 158 from the opposing optical unit. In case that a synchronization pulse 158 is detected, a synchronization answer is transmitted to the microcontroller. This particular synchronization answer contains the information whether a correct pulse pattern has been received and what time stamp information has been measured. On the other hand, if no pulse pattern is detected as shown for the ASIC# m.n+2 in the last time line of FIG. 26, no synchronization answer is transmitted hack to the microcontroller.

In particular, the synchronization subcommand for sensing synchronization pulses can he transmitted from the microcontroller in a broadcast variant so that all ASICs can execute the command. On the other hand, if a direct address method is used, only the ASIC which has a matching address will execute the command. If the address does not match, the ASIC waits for the next command.

After a specified time (tSET_S) the executing ASIC (s) enable the sensing window and try to detect the correct synchronization pattern according to the transmitted parameters and configured timing. If an ASIC could not detect the correct beam pattern, no answer will be sent to the microcontroller. Once finished, the ASIC sends the answer to the bus master after a specified time. The ASICs answer to the microcontroller contains the information of the sensed synchronization pattern and the ASIC is now ready for a new command. FIG. 26 further shows that the delay times tDELAY_COUNTER for the different ASICs are different and that in particular the ASIC with a higher priority, here the ASIC which is located further away from the microcontroller, will win the arbitration phase.

FIGS. 27 to 30 illustrate a synchronization procedure according to the present invention between a first and a second optical unit 102 and 104.

According to this particular embodiment, the optical unit 102 is defined as the principal optical unit (master) and the optical unit 104 has the function of a companion (slave).

In a first step of the synchronization procedure, the microcontroller 111 of the principal optical unit 102 transmits on the communication bus 124 a synchronization command which causes one specific optoelectronic component 116 to emit infrared radiation 114 with a particular synchronization pattern. In the shown embodiment, the ASIC nearest to the controller 111, namely 122-1, is addressed and causes its light emitting element 118 to emit the radiation 114.

According to the present invention, the infrared radiation is transmitted in a way that it reaches not only one particular receiver on the opposing side, but at least two of them. Accordingly, on the side of the companion optical unit 104, ASICs 122'-1 and 122'-2 both receive a synchronization pulse pattern. According to an advantageous embodiment of the present invention, the bus access is controlled by the so-called CSMA/CA (Carrier Sense Multiple Access/Collision Avoidance) principle so that a plurality of ASICs can send on the bus. An arbitration phase is performed which is won by the ASIC having the highest priorities. In the embodiment shown in FIG. 27 always the ASIC which is distanced further away from the microcontroller wins the arbitration phase. This control element 122'-2 is now instructed to transmit an acknowledge pulse back to the principal optical unit 102.

Figure 28:
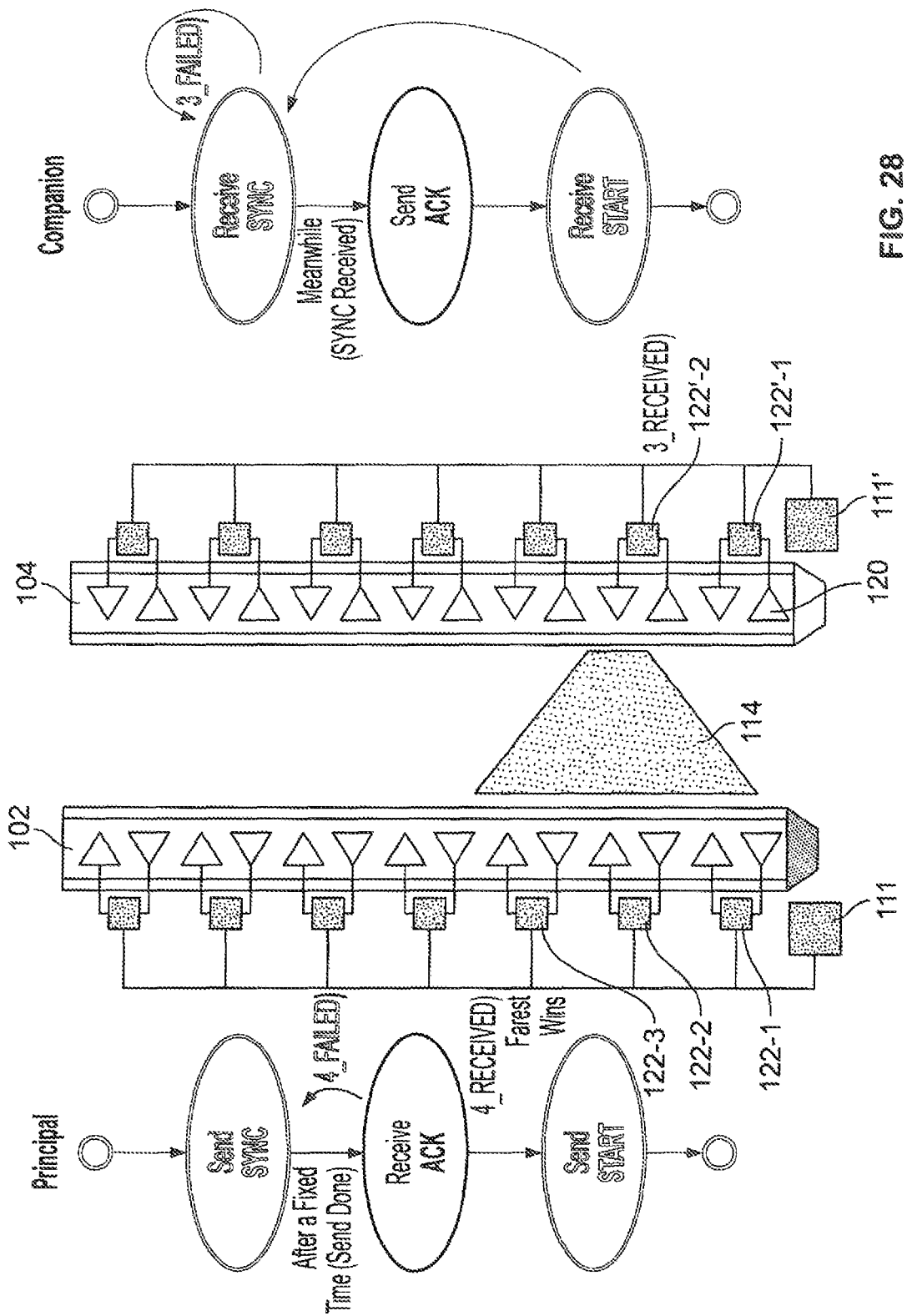
FIG. 28 shows a schematic representation of a synchronization procedure illustrating a second step.

This step is illustrated in FIG. 28. Again, the optical radiation is not only sent towards one receiving element but to more than one receiving element which means that in total three optoelectronic elements receive an acknowledge signal. The ASICs 122-1, 122-2 and 122-3 of the three optoelectronic elements send a respective message to their controller 111. Again, the arbitration phase is won by the optoelectronic element which is distanced the furthest from the controller 111. The principal optical unit 102 repeats the sending of the synchronization signal several times in case that after a pre-determined time no acknowledge signal is received. Then the same procedure starts with the next following optoelectronic element until an acknowledge pulse is received. In case that the acknowledge signal arrives at the principal optical unit 102, the time of the receipt is measured and a start pulse within a well-defined time window is emitted towards the companion optical unit 104.

Figure 29:
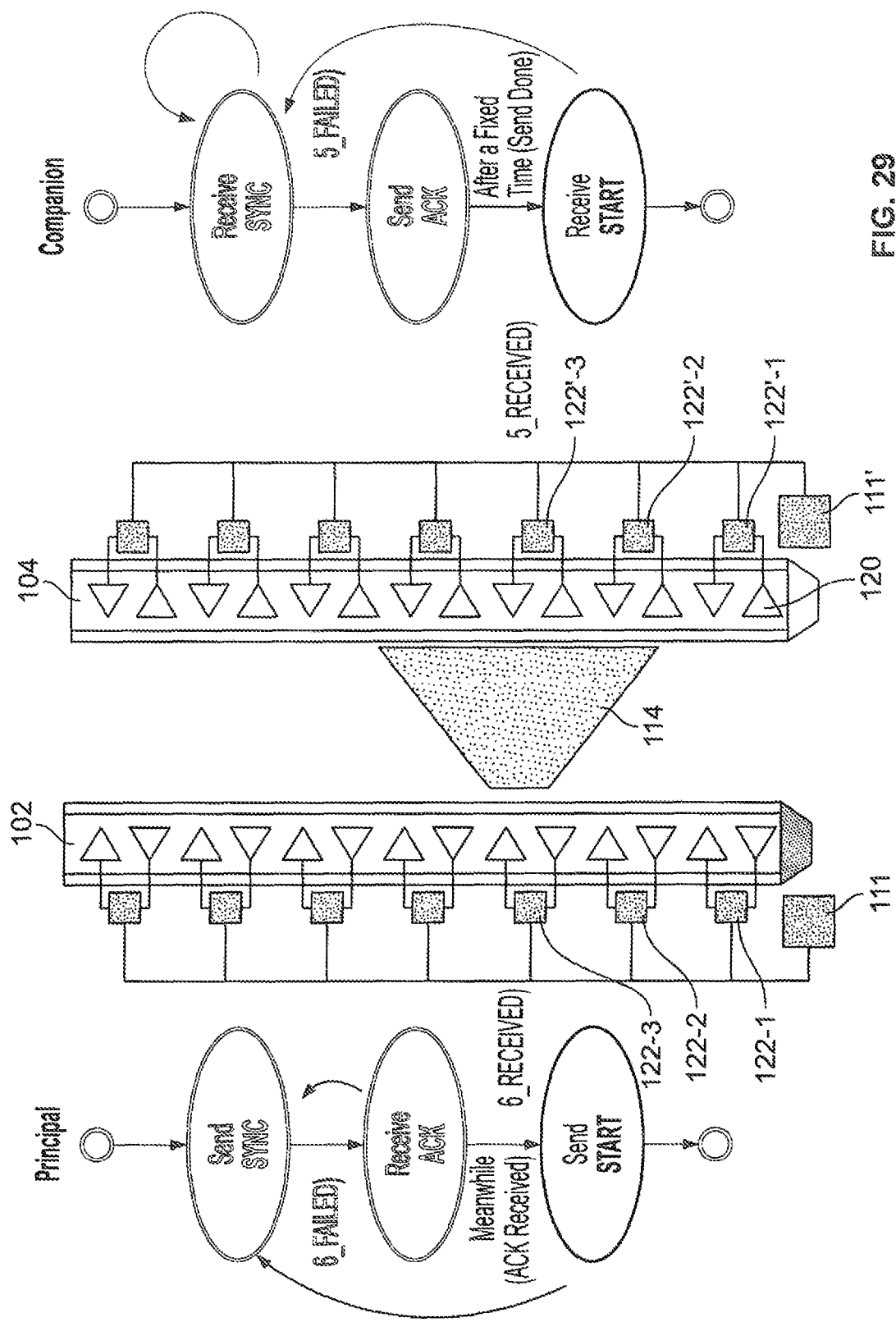
FIG. 29 shows a schematic representation of a synchronization procedure illustrating a third step.

This is illustrated in FIG. 29. According to the embodiment shown here, it is the ASIC#122-3 which instructs its emitting element to transmit the start pulse. Although the controller 111 of the principal optical unit 102 may instruct any other ASIC 122 to transmit the start pulse, it is advantageous to use one of those optoelectronic elements which have already proven that an uninterrupted light path can be established towards a companion optical unit 104.

Figure 30:
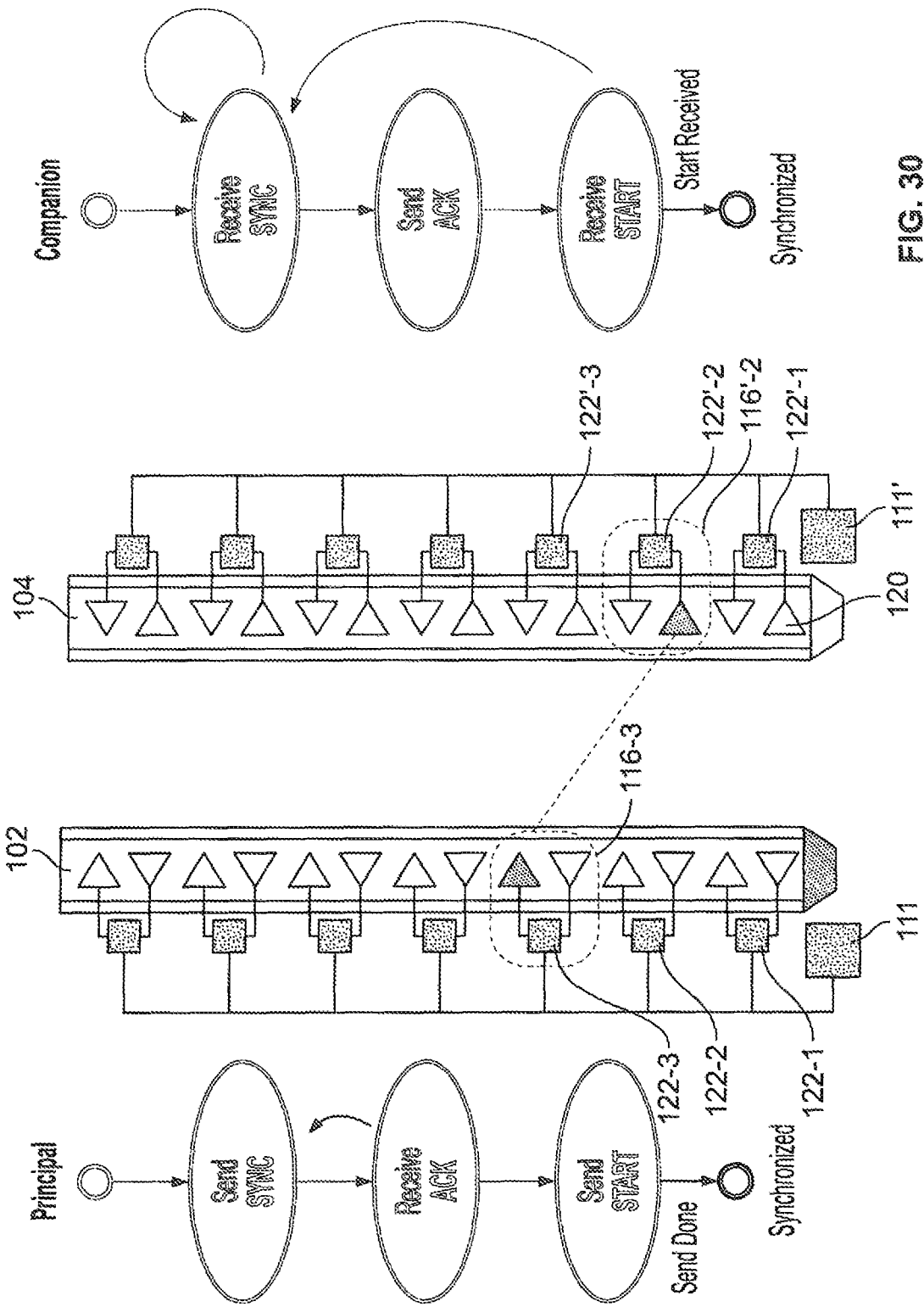
FIG. 30 illustrates a finally synchronized state of the light curtain.

In particular, as shown in FIG. 30, the measurements have shown that between the optoelectronic element 116-3 the principal optical unit 102 and the optoelectronic element 116'-2 of the companion optical unit 104, there exists an undisturbed optical path between the two optical units which for the future operation may be used for resynchronizing the two sticks if necessary.

The start pulse which is a pattern that is received by the companion optical unit 104 directly triggers the normal scan operation which therefore is directly synchronized with the principle optical unit 102.

By using more than one receiver and subsequently trying on all sending elements to establish the synchronization procedure, it can be ensured that any free region within the light curtain leads to a successful synchronization irrespective of where interruptions of the light path are present. This feature is particularly advantageous for allowing a floating blanking on the whole protective field without any restrictions due to one or more synchronization beams.

Figure 31:
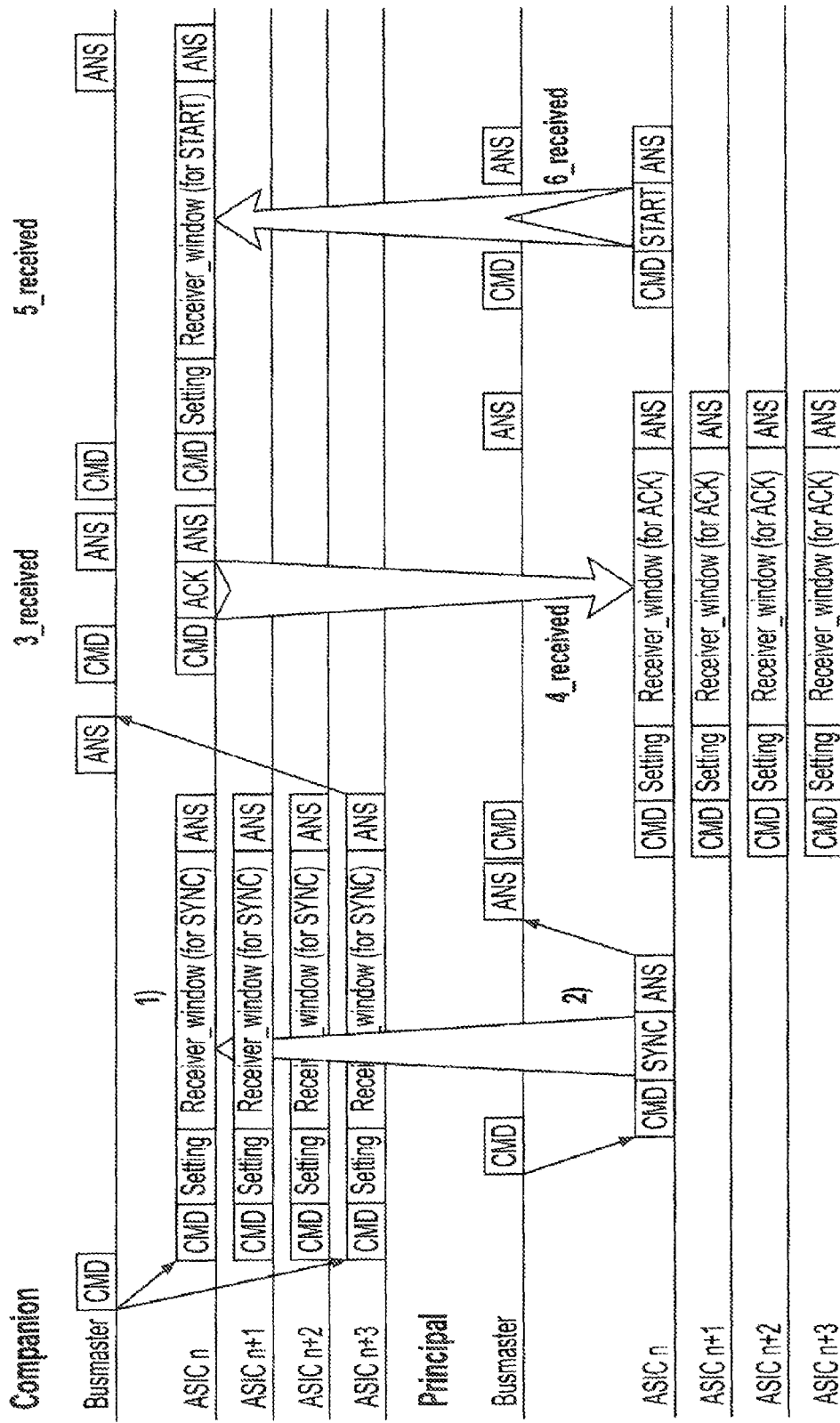
FIG. 31 shows a timing diagram illustrating the steps shown in FIGS. 27 to 30.

FIG. 31 summarizes this synchronization scheme in the form of a timing diagram for the two optical units 102 and 104 for the example of four involved ASICs. The microcontroller is the bus master in each stick. The bus master of the companion optical unit 104 transmits the broadcasting command to put all receiving elements into a receiving state where it is waiting fur a synchronization pattern. As shown in FIG. 31, ASIC# n is instructed by the bus master of the principle optical unit to emit a synchronization pattern. After having emitted the synchronization pattern, the ASIC# n informs the bus master via an answer message that the sending has been performed and the bus master subsequently instructs all ASICs to switch into a receiving mode so that an incident acknowledge signal will be detected.

One or more of the ASICs of the companion receive within their receiving window the synchronization pulse and they all answer back to the bus master.

Due to the arbitration phase only the one which is having the highest priority, here the ASIC n, is instructed to transmit an acknowledge pulse back to the principle optical unit. As here all the optoelectronic elements are enabled to receive the acknowledge pattern from the companion side, all of them send hack an answer to their principle bus master. Again the ASIC with the highest priority is instructed to emit a start pulse which according to an advantageous embodiment is received only by the particular optoelectronic element which has emitted the acknowledge pattern. This leads to the most accurate results. Upon receipt of the start pattern, the ASIC n of the companion optical unit transmits an answer to its bus master which leads to a start of the normal scan operation. Further, the two optical units now know a free beam pair which can also be used to interchange data and in any case they both simultaneously know the moment when the sequential scan through the light curtain for a normal san operation has to start.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" arc to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein, is intended merely to better illuminate the invention and does not pose a limitation on the scope of the invention unless otherwise claimed. No language in the specification should be construed as indicating any non-claimed element as essential to the practice of the invention.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A method of synchronizing at least two optical units of a photoelectric barrier, said barrier monitoring a surveillance area and comprising at least one first optical unit and at least one second optical unit, each of the first optical unit and the second optical unit comprising a plurality of optoelectronic components with at least one optical sender, at least, one optical receiver and a control element, said method comprising the steps of:
   transmitting radiation forming a synchronization signal from a first optical sender of the first optical unit, the first optical unit located on a first side of the surveillance area, to at least two optical receivers of the at least one second optical unit, the at least one second optical unit located on a second side of the surveillance area;
   receiving the transmitted radiation with the at least two optical receivers:
   generating an acknowledge signal with the corresponding control element in each optoelectronic component for the at least two optical receivers; and
   performing a synchronization step when the synchronization signal has been received, wherein the method further performs the step of defining at least one of said plurality of optoelectronic components to be used for the synchronization step.

2. The method of claim 1, wherein a timing information is stored when said synchronization signal has been received.

3. The method of claim 2, wherein said synchronization signal is expected at the second optical unit within a predefined time window and wherein a position of the detected synchronization signal within said time window is stored as a time stamp to provide said timing information.

4. The method of claim 1, further comprising the step of executing an arbitration phase within the at least one second optical unit wherein one of the at least one optical senders of the optoelectronic component is controlled to emit radiation forming the acknowledge signal generated by the corresponding control element when the synchronization signal is detected.

5. The method of claim 4 wherein a start signal is transmitted from a first optical sender of the first optical unit for starting a monitoring operation upon receipt of the acknowledge signal.

6. The method of claim 5, wherein at least one of the synchronization signal, the acknowledge signal, and the start signal is a pulsed signal that has a specific pulse pattern.

7. The method of claim 4, wherein the transmission of the synchronization signal is repeated from a second optical sender of the first optical unit when no acknowledge signal is detected after the step of transmitting the synchronization signal from the first optical sender of the first optical unit.

8. The method of claim 4, wherein the synchronization signal is transmitted sequentially by each of the plurality of the optoelectronic components until the acknowledge signal is detected or a predefined timeout is reached.

9. The method of claim 1, wherein a plurality of the optoelectronic components of one optical unit simultaneously monitors whether the synchronization signal is received.

10. The method of claim 1, wherein a plurality of optical units are synchronized with each other.

11. The method of claim 1, wherein each optoelectronic component can be used for the synchronization step.

12. The method of claim 1, wherein each optical unit further comprises a controller module, wherein the control elements of said optoelectronic components are connected to each other and to the controller module via a communication bus, and wherein said synchronization is initiated by a synchronization command transmitted from said controller module.

13. The method of claim 12, wherein each optoelectronic component is assigned a priority and wherein access to said communication bus is controlled by a bus access scheme which ensures that the optoelectronic component with the highest priority transmits data via the communication bus.

14. The method of claim 13 wherein the bus access scheme used by the optoelectronic component to transmit data is a carrier sense multiple access with collision avoidance (CSMA/CA) access scheme.

15. A photoelectric barrier for monitoring a surveillance area, said barrier comprising:
   at least one first optical unit; and
   at least one second optical unit, each of the first and the second optical unit comprising a plurality of optoelectronic components with at least one optical sender, at least one optical receiver, and a control element, wherein:
   said first and second optical units are operable to perform a synchronization step,
   at least one of said plurality of optoelectronic components of the first and the second optical units is defined to be used for the synchronization step,
   a first optical sender of the first optical unit is configured to transmit radiation forming a synchronization signal to at least two optical receivers of the at least one second optical unit, the first optical unit located on a first side of the surveillance area and the at least one second optical unit located on a second side of the surveillance area, and
   a plurality of the optical receivers of the at least one second optical unit are configured to detect the synchronization signal, and a corresponding control element in each optoelectronic component for the plurality of optical receivers is configured to generate an acknowledge signal responsive to detecting the synchronization signal, and at least one of the corresponding control elements is configured to perform a synchronization step when the synchronization signal has been received.

16. The photoelectric barrier of claim 15, wherein the control elements of said optoelectronic components are connected to each other via a communication bus.

17. The photoelectric barrier of claim 15, wherein at least one of the optical units comprises a controller module for supervising operation of said control elements.

18. The photoelectric barrier of claim 15 wherein at least one of the optical units has an interface element for electrically connecting the optical unit to an external electrical circuit.

* * * * *